(12) United States Patent
Lukefahr et al.

(10) Patent No.: US 9,639,363 B2
(45) Date of Patent: May 2, 2017

(54) HETEROGENEITY WITHIN A PROCESSOR CORE

(71) Applicants: Andrew Lukefahr, Ann Arbor, MI (US); Reetuparna Das, Ann Arbor, MI (US); Shruti Padmanabha, Ann Arbor, MI (US); Scott Mahlke, Ann Arbor, MI (US)

(72) Inventors: Andrew Lukefahr, Ann Arbor, MI (US); Reetuparna Das, Ann Arbor, MI (US); Shruti Padmanabha, Ann Arbor, MI (US); Scott Mahlke, Ann Arbor, MI (US)

(73) Assignee: The Regents of the University of Michigan, Ann Arbor, MI (US)

( * ) Notice: Subject to any disclaimer, the term of this patent is extended or adjusted under 35 U.S.C. 154(b) by 727 days.

(21) Appl. No.: 14/093,090

(22) Filed: Nov. 29, 2013

(65) Prior Publication Data

US 2015/0121048 A1    Apr. 30, 2015

Related U.S. Application Data

(60) Provisional application No. 61/897,578, filed on Oct. 30, 2013.

(51) Int. Cl.
*G06F 1/32* (2006.01)
*G06F 9/30* (2006.01)

(52) U.S. Cl.
CPC ............ *G06F 9/30189* (2013.01); *G06F 1/32* (2013.01); *G06F 1/3243* (2013.01); *Y02B 60/1214* (2013.01); *Y02B 60/1239* (2013.01)

(58) Field of Classification Search
None
See application file for complete search history.

(56) References Cited

U.S. PATENT DOCUMENTS 8,037,893 B2 * 10/2011 Aguilar, Jr. ............... G06F 8/45
137/12
2003/0149905 A1 * 8/2003 Santhanam ............... G06F 1/10
713/500

(Continued)

OTHER PUBLICATIONS

D.H. Albonesi, "Dynamically Tuning Processor Resources with Adaptive Processing" IEEE Computer, vol. 36, No. 12, Dec. 2003, pp. 49-58.

(Continued)

*Primary Examiner* — Jaweed A Abbaszadeh
*Assistant Examiner* — Keshab Pandey
(74) *Attorney, Agent, or Firm* — Nixon & Vanderhye P.C.

(57) ABSTRACT

A processor core includes a front end, and first and second back ends, the front end including a fetch engine configured to retrieve the sequence of data processing instructions for both the first back end and the second back end from a memory, and the first and second back ends are each configured to execute the sequence of program instructions. The core operates in a first mode in which the first back end is active and receives the sequence of data processing instructions from the fetch engine and the second back end is inactive, and a second mode in which the first back end is inactive and the second back end is active and receives the sequence of data processing instructions from the fetch engine, where the cycles-per-instruction rate is lower and energy consumption is higher for the first mode than the second mode.

24 Claims, 13 Drawing Sheets

(56) References Cited

U.S. PATENT DOCUMENTS

| | | | | |
|---|---|---|---|---|
| 2013/0205144 | A1* | 8/2013 | Eastlack | G06F 1/3293 713/320 |
| 2016/0195911 | A1* | 7/2016 | Chapel | G06F 1/3287 713/340 |

OTHER PUBLICATIONS

Annavaram et al, "Mitigating Amdahl's Law Though EPI Throttling" Proceedings of the 32nd Annual International Symposium on Computer Architecture, 2005, 12 pages.

R.I. Bahar et al, "Power and Energy Via Pipeline Balancing" Proc. of the 28$^{th}$ Annual International Symposium on Computer Architecture, vol. 29, No. 2, 2001, 12 pages.

S. Balakrishnan et al, "The Impact of Performance Asymmetry in Emerging Multicore Architectures" Proceedings of the 32$^{nd}$ International Symposium on Computer Architecture, Jun. 2005, 12 pages.

R. Balasubramonian et al, "Memory Hierarchy Reconfiguration for Energy and Performance in General-Purpose Processor Architectures" Proceedings of the 33$^{rd}$ Annual ACM/IEEE International Symposium on Microarchitecture, 2000, pp. 245-257.

N. Binkert et al, "The gem5 Simulator" ACM SIGARCH Computer Architecture News, vol. 39, No. 2, May 2011, p. 1-7.

L. Chen et al, "Dynamic Data Dependence Tracking and its Application to Branch Prediction" Proceedings of the Ninth International Symposium on High-Performance Computer Architecture, 2003, 12 pages.

R. Dreslinski, Jr. "Near Threshold Computing: From Single Core to Many-Core Energy Efficient Architectures" Ph.D. dissertation, The University of Michigan, 2011, 147 pages.

P. Greenhalgh, "Big.LITTLE Processing with ARM Cortex™—A15 & Cortex—A7" http://www.arm.com/files/downloads/big_LITTLE_Final_Final.pdf, Sep. 2011, 8 pages.

M.D. Hill et al, "Amdahl's Law in the Multicore Era" IEEE Computer, No. 7, Jul. 2008, pp. 33-38.

H. Homayoun et al, "Dynamically Heterogeneous Cores Through 3D Resource Pooling" Proc. of the 18$^{th}$ International Symposium on High-Performance Computer Architecture, 2012, 12 pages.

E. Ipek et al, "Core Fusion: Accommodating Software Diversity in Chip Multiprocessors" Proc. of the 34$^{th}$ Annual International Symposium on Computer Architecture, 2007, pp. 186-197.

J.A. Joao et al, "Bottleneck Identification and Scheduling in Multithreaded Applications" 20$^{th}$ International Conference on Architectural Support for Programming Languages and Operating Systems 2012, pp. 223-234.

C. Kim et al, "Composable Lightweight Processors" 40th IEEE/ACM International Symposium on Microarchitecture, 2007, pp. 381-393.

W. Kim et al, "A Fully-Integrated 3-Level DC/DC Converter for Nanosecond-Scale DVS with Fast Shunt Regulation" IEEE International Solid-State Circuits Conference, Feb. 2011, pp. 268-270.

W. Kim et al, "System Level Analysis of Fast, Per-Core DVFS using On-Chip Switching Regulators" Proc. of the 14$^{th}$ International Symposium on High-Performance Computer Architecture, 2008, pp. 123-134.

D. Koufaty et al, "Bias Scheduling in heterogeneous Multi-core Architectures" Proc. of the 5$^{th}$ European Conference on Computer Systems, Apr. 2010, pp. 125-138.

R.K. Krishnamurthy et al, "A Low-power 16-bit Multiplier-Accumulator using Series-regulated Mixed Swing Techniques" IEEE 1998 Custom Integrated Circuits Conference, 1998, pp. 499-502.

R. Kumar et al, "Conjoined-core Chip Multiprocessing" Proc. of the 37$^{th}$ International Symposium on Microarchitecture, Dec. 2004, pp. 1-12.

R. Kumar et al, "Single-ISA Heterogeneous Multi-Core Architectures: The Potential for Processor Power Reduction" Proceedings of the 36$^{th}$ International Symposium on Microarchitecture, Dec. 2003, 12 pages.

R. Kumar et al, "Core Architecture Optimization for heterogeneous Chip Multiprocessors" Proc. of the 15$^{th}$ International Conference on Parallel Architectures and Compilation Techniques, 2006, 10 pages.

R. Kumar et al, "Single-ISA Heterogeneous Multi-Core Architectures for Multithreaded Workload Performance" Proceedings of the 31$^{st}$ Annual International Symposium on Computer Architecture, 2004, 12 pages.

Y. Kwon et al, "Virtualizing Performance Asymmetric Multi-core Systems" Proc. of the 38$^{th}$ Annual International Symposium on Computer Architecture, Jun. 2011, 12 pages.

T.N. Miller et al, "Booster: Reactive Core Acceleration for Mitigating the Effects of Process Variation and Application Imbalance in Low-Voltage Chips" Proc. of the 18$^{th}$ International Symposium on High-Performance Computer Architecture, 2012, 12 pages.

G. Patsilaras et al, "Efficiently Exploiting Memory Level Parallelism on Asymmetric Coupled Cores in the Dark Silicon Era" ACM Transactions on Architecture and Code Optimization, vol. 8, No. 4, Jan. 2012, pp. 28:1-28:21.

D. Ponomarev et al, "Reducing Power Requirements of Instruction Scheduling Through Dynamic Allocation of Multiple Datapath Resources" Proc. of the 34th Annual International Symposium on Microarchitecture, Dec. 2001, pp. 90-101.

K.K. Rangan et al, "Thread Motion: Fine-Grained Power Management for Multi-Core Systems" Proc. of the 36th Annual International Symposium on Computer Architecture, Jun. 2009, 12 pages.

Sheng Li et al, "McPAT: An Integrated Power, Area, and Timing Modeling Framework for Multicore and Manycore Architectures" Proc. of the 42$^{nd}$ Annual International Symposium on Microarchitecture, Dec. 2009, pp. 469-480.

J. Suh et al, "Dynamic MIPS Rate Stabilization in Out-of-Order Processors" Proc. of the 36$^{th}$ Annual International Symposium on Computer Architecture, Jun. 2009, pp. 46-56.

M.A. Suleman et al, "Accelerating Critical Section Execution with Asymmetric Multi-Core Architectures" 17$^{th}$ International Conference on Architectural Support for Programming Languages and Operating Systems, Mar. 2009, pp. 253-364.

K. Van Craeynest et al, "Scheduling heterogeneous Multi-Cores through Performance Impact Estimation (PIE)" Proceedings of the 39$^{th}$ International Symposium on Computer Architecture, 2012, pp. 213-224.

R.E. Wunderlich et al, "SMARTS: Accelerating Microarchitecture Simulation via Rigorous Statistical Sampling" Proceedings of the 30$^{th}$ Annual International Symposium on Computer Architecture, 2003, 12 pages.

B . Xu et al, "A Methodology for the Analysis of Dynamic Application Parallelism and Its Application to Reconfigurable Computing" SPIE Conference on Reconfigurable Technology: FPGAs for Computing and Applications, SPIE vol. 3844, No. 1, Sep. 1999, pp. 78-86.

T.N. Miller et al, "Mitigating the Effects of Process Variation in Ultra-low Voltage Chip Multiprocessors using Dual Supply Voltages and Half-Speed Units" Computer Architecture Letters, 2011, pp. 1-4.

S. Heo et al, "Reducing Power Density through Activity Migration" ISLPED'03, Aug. 2003, pp. 217-222.

* cited by examiner $$CPI_{INACTIVE} = a_0 + \sum a_i x_i$$

where $x_i$ are performance
metrics for the ACTIVE mode
and $a_0$, $a_i$ are mode-specific
conversion coefficients $$\Delta CPI_{threshold} = K_p\, CPI_{error} + K_i \sum CPI_{error}$$

HETEROGENEITY WITHIN A PROCESSOR CORE

This application is related to U.S. provisional patent application 61/897,578 the content of which is incorporated herein by reference in its entirety.

BACKGROUND

The present invention relates to the field of data processing. More particularly, this invention relates to the configuration of a processor core configured to carry out data processing operations.

Heterogeneous multicore systems—comprised of multiple cores with varying capabilities, performance, and energy characteristics—have emerged as a promising approach to increasing energy efficiency and alleviating serial bottlenecks. The big.LITTLE technology provided by ARM Limited, Cambridge, UK is one example. This technology combines a set of Cortex-A15 ("big") cores with Cortex-A7 ("LITTLE") cores to create a heterogeneous processor. The Cortex-A15 is a 3-way out-of-order device with deep pipelines (15-25 stages). Conversely, the Cortex-A7 is a narrow in-order processor with a relatively short pipeline (8-10 stages). The Cortex-A15 has 2-3× higher performance, but the Cortex-A7 is 3-4× more energy efficient. Such systems reduce energy consumption by identifying phase changes in an application and migrating execution to the most efficient core that meets its current performance requirements. Known designs select the best core by briefly sampling performance on each. However, every time the application migrates between cores, its current state must be explicitly transferred or rebuilt on the new core. This state transfer incurs large overheads that limits migration between cores to a granularity of tens to hundreds of millions of instructions. To mitigate these effects, the decision to migrate applications is done at the granularity of operating system time slices.

R. Kumar, K. I. Farkas, N. P. Jouppi, P. Ranganathan, and D. M. Tullsen, "Single-ISA Heterogeneous Multi-Core Architectures: The Potential for Processor Power Reduction," in Proc. of the 36th Annual International Symposium on Microarchitecture, December 2003, pp. 81-92, considers migrating thread context between out-of-order and in-order cores for the purposes of reducing power. At coarse granularities of 100M instructions, one or more of the inactive cores are sampled by switching the thread to each core in turn. The switches comprise flushing dirty L1 data to a shared L2, which is slow and energy consuming.

Rather than relying on sampling the performance on both cores, K. Van Craeynest, A. Jaleel, L. Eeckhout, P. Narvaez, and J. Emer, "Scheduling heterogeneous multi-cores through performance impact estimation (pie)," in Proceedings of the 39th International Symposium on Computer Architecture, ser. ISCA '12, 2012, pp. 213-224 proposes a coarse-grained mechanism that relies on measures of CPI, MLP, and ILP to predict the performance on the inactive core. On the other hand, K. K. Rangan, G.-Y. Wei, and D. Brooks, "Thread motion: fine-grained power management for multi-core systems," in Proc. of the 36th Annual International Symposium on Computer Architecture, 2009, pp. 302-313 examines a CMP with clusters of in-order cores sharing L1 caches. While the cores are identical architecturally, varied voltage and frequency settings create performance and power heterogeneity. A simple performance model is made possible by having exclusively in-order cores, and thread migration is triggered every 1000 cycles by a history-based (last value) predictor.

Another class of work targets the acceleration of bottlenecks to thread parallelism. Segments of code constituting bottlenecks are annotated by the compiler and scheduled at runtime to run on a big core. M. A. Suleman, O. Mutlu, M. K. Qureshi, and Y. N. Patt, "Accelerating critical section execution with asymmetric multi-core architectures," in 17th International Conference on Architectural Support for Programming Languages and Operating Systems, 2009, pp. 253-264 describes a detailed architecture and target critical sections, and J. A. Joao, M. Suleman, O. Mutlu, and Y. N. Patt, "Bottleneck identification and scheduling in multi-threaded applications," in 20th International Conference on Architectural Support for Programming Languages and Operating Systems, 2012, pp. 223-234 generalizes this work to identify the most critical bottlenecks at runtime. G. Patsilaras, N. K. Choudhary, and J. Tuck, "Efficiently exploiting memory level parallelism on asymmetric coupled cores in the dark silicon era," ACM Trans. Archit. Code Optim., vol. 8, no. 4, pp. 28:1-28:21, January 2012 proposes building separate cores, one that targets MLP and the other that targets ILP. They then use L2 cache miss rate to determine when an application has entered a memory intensive phase and map it to the MLP core. When the cache misses decrease, the system migrates the application back to the ILP core.

Other work studies the benefits of heterogeneity in real systems. M. Annavaram, E. Grochowski, and J. Shen, "Mitigating Amdahl's law through EPI throttling," in Proceedings of the 32nd Annual International Symposium on Computer Architecture, 2005, pp. 298-309 shows the performance benefits of heterogeneous multi-cores for multithreaded applications on a prototype with different frequency settings per core. Y. Kwon, C. Kim, S. Maeng, and J. Huh, "Virtualizing performance asymmetric multi-core systems," in Proc. of the 38th Annual International Symposium on Computer Architecture, 2011, pp. 45-56 motivates asymmetry-aware hypervisor thread schedulers, studying cores with various voltage and frequency settings. D. Koufaty, D. Reddy, and S. Hahn, "Bias scheduling in heterogeneous multi-core architectures," in Proc. of the 5th European Conference on Computer Systems, 2010, pp. 125-138 discovers an application's big or little core bias by monitoring stall sources, to give preference to OS-level thread migrations which migrate a thread to a core it prefers. A heterogeneous multi-core prototype is produced by throttling the instruction retirement rate of some cores down to one instruction per cycle.

Other designs propose allowing a thread to adapt (borrow, lend, or combine) hardware resources, and still other designs allow dynamic voltage/frequency scaling (DVFS). Alternatively, asymmetry can be introduced by dynamically adapting a core's resources to its workload. Prior work has suggested adapting out-of-order structures such as the issue queue (see R. Bahar and S. Manne, "Power and energy reduction via pipeline balancing," Proc. of the 28th Annual International Symposium on Computer Architecture, vol. 29, no. 2, pp. 218-229, 2001), as well as other structures such as ROBs, LSQs, and caches (see: D. Ponomarev, G. Kucuk, and K. Ghose, "Reducing power requirements of instruction scheduling through dynamic allocation of multiple datapath resources," in Proc. of the 34th Annual International Symposium on Microarchitecture, December 2001, pp. 90-101; R. Balasubramonian, D. Albonesi, A. Buyuktosunoglu, and S. Dwarkadas, "Memory hierarchy reconfiguration for energy and performance in general-purpose processor architectures," in Proceedings of the 33rd annual ACM/IEEE international symposium on Microarchitecture, 2000, pp. 245-257; and D. Albonesi, R. Balasubramonian, S. Dropsbo, S. Dwarkadas, E. Friedman, M. Huang, V. Kursun, G. Magklis, M. Scott, G. Semeraro, P. Bose, A. Buyuktosunoglu, P. Cook, and S. Schuster, "Dynamically tuning processor resources with adaptive processing," IEEE Computer, vol. 36, no. 12, pp. 49-58, December 2003).

R. Kumar, N. Jouppi, and D. Tullsen, "Conjoined-core chip multiprocessing," in Proc. of the 37th Annual International Symposium on Microarchitecture, 2004, pp. 195-206 explored how a pair of adjacent cores can share area expensive structures, while keeping the floorplan in mind H. Homayoun, V. Kontorinis, A. Shayan, T.-W. Lin, and D. M. Tullsen, "Dynamically heterogeneous cores through 3d resource pooling," in Proc. of the 18th International Symposium on High-Performance Computer Architecture, 2012, pp. 1-12 examined how micro-architectural structures can be shared across 3D stacked cores. These techniques are limited by the structures they adapt and cannot for instance switch from an out-of-order core to an in-order core during periods of low ILP.

E. Ipek, M. Kirman, N. Kirman, and J. Martinez, "Core fusion: Accommodating software diversity in chip multiprocessors," in Proc. of the 34th Annual International Symposium on Computer Architecture, 2007, pp. 186-197 and C. Kim, S. Sethumadhavan, M. S. Govindan, N. Ranganathan, D. Gulati, D. Burger, and S. W. Keckler, "Composable lightweight processors," in Proceedings of the 40th Annual IEEE/ACM International Symposium on Microarchitecture, 2007, pp. 381-394 describe techniques to compose or fuse several cores into a larger core. While these techniques provide a fair degree of flexibility, a core constructed in this way is generally expected to have a datapath that is less energy efficient than if it were originally designed as an indivisible core of the same size.

DVFS approaches reduce the voltage and frequency of the core to improve the core's energy efficiency at the expense of performance. However, when targeted at memory-bound phases, this approach can be effective at reducing energy with minimal impact on performance. Similar to traditional heterogeneous multicore systems, the overall effectiveness of DVFS suffers from coarse-grained scheduling intervals in the millisecond range. In addition, providing independent DVFS settings for more than two cores is costly in terms of both area and energy. Despite these limitations, DVFS is still widely used in production processors today, and has for example been incorporated into the above-mentioned ARM big.LITTLE heterogeneous multicore system. Two competing techniques to enable fine-grained DVFS, fast on-chip regulators (see W. Kim, M. S. Gupta, G.-Y. Wei, and D. Brooks, "System level analysis of fast, per-core DVFS using on-chip switching regulators," in Proc. of the 14th International Symposium on High-Performance Computer Architecture, 2008, pp. 123-134 and W. Kim, D. Brooks, and G.-Y. Wei, "A fully-integrated 3-level DCDC converter for nanosecond-scale DVFS," IEEE Journal of Solid-State Circuits, vol. 47, no. 1, pp. 206-219, January 2012) and dual voltage rails (see T. N. Miller, X. Pan, R. Thomas, N. Sedaghati, and R. Teodorescu, "Booster: Reactive core acceleration for mitigating the effects of process variation and application imbalance in low-voltage chips," in Proc. of the 18th International Symposium on High-Performance Computer Architecture, vol. 0, 2012, pp. 1-12 and R. Dreslinski, "Near threshold computing: From single core to manycore energy efficient architectures," Ph.D. dissertation, University of Michigan, 2011), have recently been proposed that promise to deliver improved transition latencies.

Despite these varied advances in the technology, the applicant considers that there remains the opportunity to improve on the prior art.

SUMMARY

Viewed from a first aspect, the present invention provides a processor core configured to carry out data processing operations in dependence on a sequence of data processing instructions, the processor core comprising:

a front end, a first back end and a second back end, the front end comprising a fetch engine configured to retrieve the sequence of data processing instructions for both the first back end and the second back end from a memory, and the first and second back ends each configured to execute the sequence of program instructions, wherein the processor core is configured to operate in a first mode in which the first back end is active and receives the sequence of data processing instructions from the fetch engine and the second back end is inactive, and the processor core is configured to operate in a second mode in which the first back end is inactive and the second back end is active and receives the sequence of data processing instructions from the fetch engine, wherein an average cycles-per-instruction rate is lower and an energy consumption is higher for the first mode than the second mode, and the processor core further comprises a performance controller configured to control whether the processor core operates in the first mode or the second mode to thereby satisfy a predetermined metric which counterbalances the energy consumption and the cycles-per-instruction rate.

In seeking to improve on the prior art the inventors of the present invention have realised that the performance of a heterogeneous data processing apparatus could be improved by pushing the heterogeneity of that data processing apparatus, essentially provided by the differing processing capabilities of two execution pipelines, into a single processor core. The provision of these two execution pipelines enables the processor core to operate in a first mode in which one is active and the other is inactive, and in a second mode in which the respective activity/inactivity is reversed. When the processor core operates in the first mode its average cycles-per-instruction rate is lower, but at the price of a higher energy consumption. When the processor core operates in the second mode its average cycles-per-instruction rate is higher, but the energy consumption is correspondingly reduced. By appropriately switching between the first mode and second mode this then provides the processor core with the ability to meets its current performance requirements by identifying phase changes in an application and migrating execution of the sequence of data processing instructions to the most efficient execution pipeline. For example, the processor core can activate the "big" execution pipeline with the lower average cycles-per-instruction rate when high performance is required and instead activate the "little" execution pipeline with the higher cycles-per-instruction rate (but lower energy consumption) to save energy in situations that do not require high-performance or when neither back end can achieve high performance.

A particular feature of the processor core provided by the present invention is that although two separate execution pipelines are provided, these are fed instructions retrieved from memory by a shared fetch engine. Accordingly the core can be viewed as essentially comprising a front end and first and second back ends, in which the single front end provides the shared fetch engine and each execution pipeline is provided by one of the back ends respectively. The fetch engine is shared in the sense that it continues fetching the same sequence of data processing instructions from the memory, regardless of which execution pipeline these instructions will ultimately be executed by. Instead the performance controller, as part of controlling whether the processor core operates in the first mode or the second mode, dictates which back end receives the instructions that have been received by the shared fetch engine.

The sharing of the front end by the first and second back end (which may in some embodiments further involve sharing such features as L1 instruction and data caches, a shared branch prediction unit associated with the fetch engine, and/or one or more shared TLBs) enables much of the architectural state to be shared between the first and second back ends. This sharing of architectural state between the back ends has the particular consequence that the switching overhead associated with migrating the processor core between the first mode and the second mode is greatly reduced with respect to traditional heterogeneous multi-core systems, in which when an application's execution migrates between cores, its current state must be explicitly transferred or rebuilt on the new core. This inter-core state transfer incurs large overheads that typically limits the migration between cores to a coarse granularity of tens to hundreds of millions of instructions. To mitigate against these effects, in the prior art the decision to migrate applications is done at the granularity of operating system time slices.

However the sharing of architectural state enabled by the arrangement of the processor core of the present invention and the resulting reduction in the switching overhead enables the performance controller to administer a much more fine-grained switching of the processor core between the first mode and second mode, which thus increases the opportunities to utilize the second, more energy efficient back end without sacrificing performance. Indeed the inventors of the present invention consider that the coarse switching granularity in existing heterogeneous processor designs limits their effectiveness and energy savings. Accordingly the present invention proposes a "composite core" architecture that brings the concept of heterogeneity to within a single processor core, and wherein the switching between the heterogeneous capabilities (the "big" and the "little" back ends) of that single core can occur on a much finer granularity (for example on the order of a thousand instructions) compared to past heterogeneous multicore proposals, allowing the application to spend more time on the energy efficient little back end without sacrificing additional performance.

The performance controller may be configured in a variety of ways, but in some embodiments the performance controller comprises a performance estimator configured, when the processor core is in the first mode, to generate an estimated cycles-per-instruction rate of the processor core over a predetermined interval if the processor had been in the second mode, and configured, when the processor core is in the second mode, to generate the estimated cycles-per-instruction rate of the processor core over the predetermined interval if the processor had been in the first mode.

The traditional approach to determining when to switch between two heterogeneous processing capabilities of a heterogeneous data processing device is to sample execution for each for a short duration at the beginning of each quantum (this being the predetermined minimum period over which the device can use one processing capability or the other) and to base the decision for the remainder of the quantum (also known as an "epoch") on the sample measurements. However, this approach is not feasible for fine-grained quanta such as those enabled by the present techniques for two reasons. Firstly, the additional switching necessary for sampling would require much longer quanta to amortize the overheads, forfeiting the very potential energy gains provided by the present techniques. Secondly, the stability and accuracy of fine-grained performance sampling drops rapidly, since performance variability grows as the measurement length shrinks.

Moreover traditional heterogeneous multicore systems rely on coarse-grained switching to exploit application phases that occur at a granularity of hundreds of millions to billions of instructions. These systems assume the performance within a phase is stable, and simple sampling-based monitoring systems can recognize low-performance phases and map them to a more energy efficient core. While these long term low-performance phases do exist, in many applications, they occur infrequently, limiting the potential to utilize a more efficient core.

Furthermore, simple rule based techniques, such as switching to the more efficient back end on a cache miss, cannot provide an effective performance estimate needed to allow the user to configure the performance target (predetermined metric). Moreover as the performance controller is expected to run frequently, within the above-mentioned fine-grained quanta, more complex approaches, such as non-linear or neural-network models, add too much energy overhead and hardware area to be practical. Therefore the present techniques instead provide a performance controller which generates an estimated cycles-per-instruction rate of the processor core if the currently inactive back end had instead been the active back end. In other words, whilst the first "big" back end is running (in the first mode), the performance controller generates the estimated cycles-per-instruction rate if the second "little" back end had instead been running, and whilst the second "little" back end is running (in the second mode), the performance controller generates the estimated cycles-per-instruction rate if the first "big" back end had instead been running. This enables the performance controller to determine which mode is preferable on the time scales of the required fine-grained quanta.

In some embodiments the performance estimator is configured to receive a plurality of performance metrics indicative of a current performance of the processor core and to generate the estimated cycles-per-instruction rate in dependence on the plurality of performance metrics, wherein a mode-specific conversion coefficient is applied to each performance metric.

These performance metrics can be selected to capture fundamental characteristics of the execution of the application currently running on the active back end and may for example comprise: an L2 cache miss rate, a count of branch mispredictions, a measure of instruction level parallelism (ILP), L2 hit rate, a measure of memory level parallelism (MLP), and/or a count of active execution pipeline cycles. Recognising that each of these characteristics will typically be different for each back end, a mode-specific conversion coefficient is applied to each performance metric to allow the conversion of the observed performance metrics on the active back end into estimates of these performance metrics for the inactive back end, and thus to generate the estimated cycles-per-instruction rate for the inactive back end. The mode-specific conversion coefficients may for example be determined in advance by profiling a number of benchmark applications executing in the first mode and in the second mode. Techniques such as a ridge regression analysis may then be used to determine the coefficients using the aggregated performance metrics from all benchmarks.

Advantageously this allows the performance estimator to use a relatively simple performance model to estimate the performance of the inactive back end. For example in some embodiments the performance estimator is configured to generate the estimated cycles-per-instruction rate using a linear sum of the plurality of performance metrics each scaled by its respective mode-specific conversion coefficient. This facilitates the fast determination of the estimated cycles-per-instruction rate.

In some embodiments the performance estimator is configured to vary the mode-specific conversion coefficient applied to each performance metric in dependence on a data processing operations carried out by the processor core. As such, specific sets of coefficients can be provided which are tuned for particular processing applications which are known will be carried out by the processor core, and where it is known that, depending on the particular application, the selected performance metrics have varying conversion ratios between the two modes of operation.

The particular manner in which the performance controller is configured to dictate which mode the processor core operates in with reference to the estimated cycles-per-instruction rate may take a number of different forms, but in some embodiments the performance controller comprises a switching controller configured to cause the processor core to switch to the second mode if the estimated cycles-per-instruction rate is less than a measured first mode cycles-per-instruction rate of the processor core over the predetermined interval plus a threshold value, and configured to cause the processor core to switch to the first mode if the estimated cycles-per-instruction rate plus the threshold value is less than a measured second mode cycles-per-instruction rate of the processor core over the predetermined interval.

The use of a threshold value (difference) in the comparison between the estimated cycles-per-instruction rate and the measured first or second mode cycles-per-instruction rate advantageously provides a configuration in which a measure of the current maximum performance loss allowed when running in the second mode with the second (little) back end (slower but more efficient) active can be respected. The threshold value can thus provide an average per-quantum performance loss where using the little second (little) back end is profitable given a particular performance (cycles-per-instruction rate) target.

In some embodiments the performance controller comprises a threshold controller configured to set the threshold value in dependence on a difference between a target cycles-per-instruction rate and an observed cycles-per-instruction rate for the processor core. It is further advantageous if the threshold value can be varied, because it is recognised that some applications experience frequent periods of similar performance whether the processor core is operating in the first or the second mode, and in such situations (identified by the difference between the target cycles-per-instruction rate and the observed cycles-per-instruction rate) the threshold controller can scale the threshold value low to ensure that the second (little) back end is only used when it is of maximum benefit. Conversely for applications that experience almost no low performance periods (also identified by observation of the difference between the target cycles-per-instruction rate and the observed cycles-per-instruction rate), the threshold controller can scale the threshold higher allowing the second (little) back end to run with a larger performance difference but less frequently. The observed cycles-per-instruction rate for the processor core can be determined by simply summing the observed cycles-per-instruction rate for all previous quanta (whether the processor core was running the first or the second mode).

The threshold controller could be configured to set the threshold value in a number of different ways in dependence on the difference, but in some embodiments the threshold controller is configured to set the threshold value in dependence on a proportional-integral summation of the difference. Accordingly a proportional coefficient can be used to scale the threshold value based on current difference, whilst an integral coefficient can be used to scale the threshold based on the sum of past errors. A derivative coefficient could be added to minimize overshoot.

The constant proportional and integral coefficients may for example be determined experimentally, without any user constraint. Whether experimentally set or user set, in some embodiments a proportional coefficient is at least 100 times larger than an integral coefficient in the proportional-integral summation. A relatively large proportional coefficient can reflect the fact that it is desirable for a large error to be corrected immediately. Nevertheless, it is further recognised that the proportional coefficient may systematically underestimate the overall performance target and therefore the integral coefficient can be set to correct for small but systematic under-performance. The setting of the integral coefficient at least 100 times smaller than the proportional term, in a preferred embodiment even about three orders of magnitude smaller, ensures that it only factors into varying the threshold value when a long-term pattern is detected.

In some embodiments the performance estimator is configured to set the target cycles-per-instruction rate using a sum of previously measured first mode cycles-per-instruction rates and previously estimated first mode cycles-per-instruction rates, scaled by a predetermined allowed slowdown factor. Accordingly the target cycles-per-instruction rate can be determined with reference only to the first mode operation of the processor core (observed and estimated), in other words the cycles-per-instruction rate that could have been achieved by only running the processor core in the first mode and thus only using the first (big) back end, which is configured to have a lower average cycles-per-instruction rate (i.e. higher performance) than the second (little) back end. This thus represents the highest performance level which the processor core could (without regard to energy consumption) have achieved. The scaling by the allowed slowdown factor allows the system user to dictate the performance degradation which is considered to be acceptable, where this is accepted because of the associated reduction in energy consumption.

In some embodiments the processor core is configured to perform a mode switch in response to a mode switch signal from the performance controller which indicates that the processor core should switch from a current mode of the first mode and the second mode to a target mode of the first mode and the second mode, wherein the mode switch comprises the fetch engine stopping providing the sequence of data processing instructions to an active back end of the first back end and second back end which has been active in the current mode, the processor core switches to the target mode after all pending data processing instructions have completed in the active back end, and thereafter the fetch engine begins providing the sequence of instructions to a target back end of the first back end and the second back end which is active in the target mode.

The fetch engine thus operates under the control of the performance controller, in particular in that the mode selected by the performance controller dictates which back end receives the sequence of instructions which the fetch engine is retrieving from the memory. However, in addition when transitioning from one mode to the other (from a current mode to a target mode) it is of course required for this transition to happen in an orderly manner. One particular aspect of the processor core which must be respected is that fact that the two back ends of the processor core share architectural state, and accordingly it is important to ensure that the two back ends do not conflict in both seeking to amend any particular item of architectural state as the transition from the current mode to the target mode is carried out. To ensure that such conflict is avoided, these embodiments provide that instructions which have already entered the active back end (active in the current mode) are allowed to complete before the processor core switches to the target mode and the fetch engine begins providing the sequence of instructions to a target back end which is active in the target mode.

In some embodiments the first back end comprises a first register file and the second back end comprises a second register file, wherein the mode switch comprises the processor core initiating transfer of content from an active register file of the first register file and the second register file to a target register file of the first register file and the second register file in response to the mode switch signal and before all pending data processing instructions have completed in the active back end, and the processor core switches to the target mode after completion of the transfer of content from the active register file to the target register file.

Accordingly, the present techniques further recognise that the latency associated with allowing all pending data processing instructions to complete in the active back end before the processor core switches to the target mode can be mitigated against. This can be achieved by beginning the transfer of architectural state from the register file of the active back end to the register file of the target back end before the pending instructions in the active back end have completed. This then means that the completed switch to the target mode, and in particular when the target back end begins executing instructions provided to it by the fetch engine, can happen sooner after the mode switch signal has first been issued by the performance controller.

In some embodiments, in response to the mode switch signal and before the transfer of content from the active register file to the target register file begins, register values stored in the active register file are marked as untransferred, and when a selected register value is transferred from the active register file to the target register file the selected register value is marked as transferred, and if a pending data processing instruction draining from the active back end amends the selected register value it is remarked as untransferred, and the transfer of content continues until all pending data processing instructions have completed in the active back end and all register values stored in the active register file are marked as transferred.

The present techniques thus further recognise that when the transfer of architectural state from the register file of the active back end to the register file of the target back end begins before the pending instructions in the active back end have completed, there exists the possibility that the completion of those pending instructions in the (still) active back end will change particular register values in the register file of the active back after those particular register values have already been speculatively copied to the target register file. To ensure that the target register file is not populated by any out-dated register values when the target back end begins operation in the target mode, the marking of the register values stored in the active register file as transferred or untransferred, and remarking any register values affected by the completion of pending instructions in the (still) active back end as untransferred, ensures that the target register file will ultimately only be populated by the correct register values from after all pending instructions in the (still) active back end have completed.

Depending on the particular system performance requirements, the predetermined metric on the basis of which the performance controller controls whether the processor core operates in the first mode or the second mode may be variously configured. For example in some embodiments the predetermined metric is configured to minimise the energy consumption subject to a maximum cycles-per-instruction rate. In other embodiments the predetermined metric is configured to minimise the cycles-per-instruction rate subject to a maximum energy consumption.

The configuration of the first and the second back end which results in the average cycles-per-instruction rate being lower and the energy consumption being higher for the first back end with respect to the second back end may take a variety of forms, but in some embodiments the first back end comprises an out-of-order execution pipeline and the second back end comprises an in-order execution pipeline.

In order to reduce the energy consumption of the processor core, in some embodiments the second back end is clock gated in the first mode and the first back end is clock gated in the second mode.

The benefits provided by the present techniques are enhanced by the degree to which architectural state can be shared between the first and second back ends and in support of this in some embodiments the front end comprises a shared instruction cache associated with the fetch engine. Further, in some embodiments the front end comprises a shared branch prediction unit associated with the fetch engine. Still further, in some embodiments the first back end and the second back end are each configured to access the memory via a shared first level data cache.

In some embodiments it may be possible for the first and second back end to share a decode stage configured to decode the sequence of instructions for either back end (in dependence on which back end is currently active), but the inventors of the present techniques have realised that where the first back end and second back end are configured to have significantly different performance characteristics, for example in the above described variant where the first back end comprises an out-of-order execution pipeline and the second back end comprises an in-order execution pipeline, a more efficient overall configuration may be provided where the first back end comprises a first decode stage configured to decode the sequence of program instructions for the first back end, and wherein the second back end comprises a second decode stage configured to decode the sequence of program instructions for the second back end.

The quantum for which the processor core operates in a selected mode as dictated by the performance controller, and over which the performance controller determines the on-going performance of the processor core and whether the processor core should next switch to the other mode, may be defined to be of a particular duration as suited to the relative configuration of the two back ends and the particular application which the processor core is executing. In particular as highlighted above, the benefits provided by the present techniques are particularly apparent when the quantum is rather short by comparison to the analysis and switching quanta used by prior art heterogeneous multicore systems, which may have a granularity of tens to hundreds of millions of instructions. In some preferred embodiments the performance controller is configured to regularly determine at a predetermined interval if the processor core should switch between the first mode and the second mode, wherein the predetermined interval is less than one hundred thousand instructions. In some particularly preferred embodiments the predetermined interval is less than ten thousand instructions. Indeed the predetermined interval may be only of the order of a thousand instructions.

Viewed from a second aspect, the present invention provides a method of operating a processor core configured to carry out data processing operations in dependence on a sequence of data processing instructions, wherein the processor core comprises a front end, a first back end and a second back end, the front end comprises a fetch engine configured to retrieve the sequence of data processing instructions for both the first back end and the second back end from a memory, and the first and second back ends are each configured to execute the sequence of program instructions, the method comprising the steps of:

operating in a first mode in which the first back end is active and receives the sequence of data processing instructions and the second back end is inactive;

operating in a second mode in which the first back end is inactive and the second back end is active and receives the sequence of data processing instructions, wherein an average cycles-per-instruction rate is lower and an energy consumption is higher for the first mode than the second mode; and controlling whether the processor core operates in the first mode or the second mode to thereby satisfy a predetermined metric which counterbalances the energy consumption and the cycles-per-instruction rate.

Viewed from a third aspect the present invention provides a processor core configured to carry out data processing operations in dependence on a sequence of data processing instructions, the processor core comprising:

a front end, a first back end and a second back end, the front end comprising means for retrieving the sequence of data processing instructions for both the first back end and the second back end from a memory, and the first and second back ends each comprising means for executing the sequence of program instructions, wherein the processor core is configured to operate in a first mode in which the first back end is active and receives the sequence of data processing instructions from the means for retrieving and the second back end is inactive, and the processor core is configured to operate in a second mode in which the first back end is inactive and the second back end is active and receives the sequence of data processing instructions from the means for retrieving, wherein an average cycles-per-instruction rate is lower and an energy consumption is higher for the first mode than the second mode, and the processor core further comprises means for controlling whether the processor core operates in the first mode or the second mode to thereby satisfy a predetermined metric which counterbalances the energy consumption and the cycles-per-instruction rate.

BRIEF DESCRIPTION OF THE DRAWINGS

The present invention will be described further, by way of example only, with reference to embodiments thereof as illustrated in the accompanying drawings, in which.

DESCRIPTION OF EXAMPLE EMBODIMENTS

Figure 1:
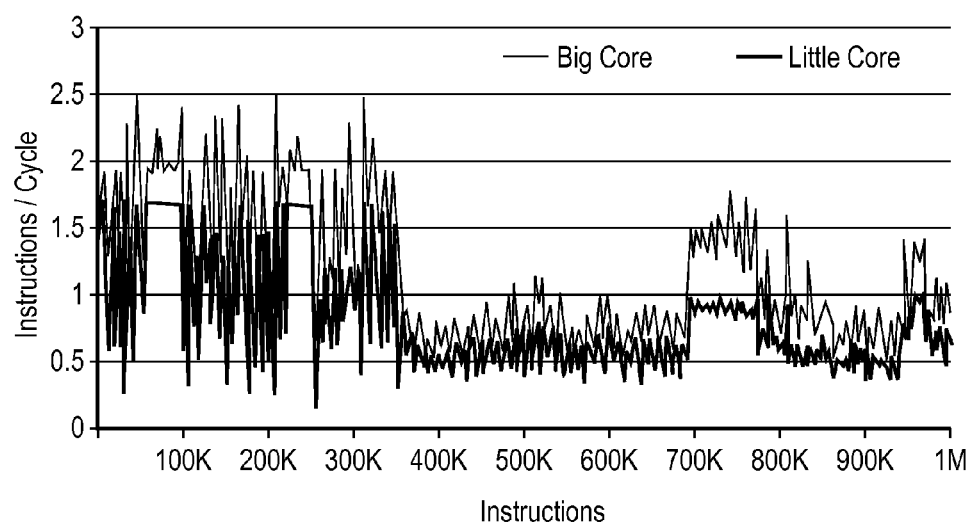
FIG. 1 shows traces of the instructions-per-cycle count for a selected benchmark application executing on a three wide out-of-order "big" core and executing on a two wide in-order "little" core.

Prior art heterogeneous multicore systems which switch between asymmetrically configured cores having different performance/energy ratios rely on coarse-grained switching to exploit application phases that occur at a granularity of hundreds of millions to billions of instructions. These systems assume the performance within a phase is stable, and simple sampling-based monitoring systems can recognize low-performance phases and map them to a more energy efficient core. While these long term low-performance phases do exist, in many applications they occur infrequently, limiting the potential to utilize a more efficient core. Observing performance at much finer granularity reveals more low-performance periods, increasing opportunities to utilize a more energy efficient core. FIG. 1 shows a trace of the instructions-per-cycle (IPC) for the 403.gcc benchmark over a typical operating system scheduling interval of one million instructions for both a three wide out-of-order ("big") core and a two wide in-order ("little") core.

Over the entire interval, the little core is an average of 25% slower than the big core, which in a prior art heterogeneous multicore system may necessitate that the entire phase be run on the big core, if the performance metric defined for this system will not accept such a performance slowdown at the price of the reduced power consumption of running the little core. However if the performance is examined with finer granularity it can be observed that, despite some periods of relatively high performance difference, there are numerous periods where the performance gap between the cores is negligible. Zooming in to view performance at even finer granularity (100s to 1000s of instructions), it is found that, even during intervals where the big core outperforms the little on average, there are brief periods where the cores experience similar stalls and the performance gap between them is negligible.

Figure 2:
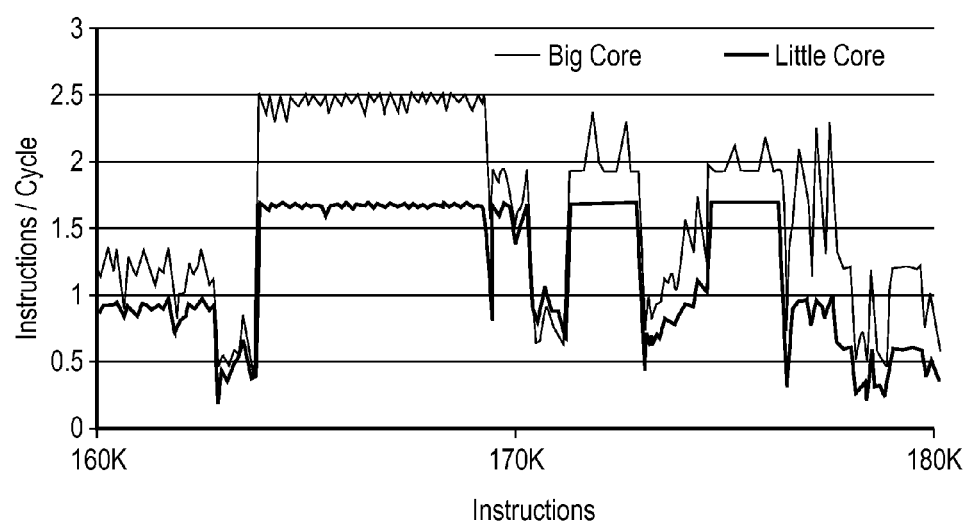
FIG. 2 shows a subset of the traces shown in FIG. 1.

FIG. 2 illustrates a subset of the trace from FIG. 1 where the big core has nearly 40% better performance, yet brief regions can be seen where there is no performance gap. Such regions, where the performance difference between the big and the little core is insignificant, would thus present an opportunity for switching to little core operation to benefit from the more energy efficient configuration. Nevertheless, exploiting such fine-grained quanta has not been possible in prior art heterogeneous multicore systems which switch between asymmetrically configured cores, because of the cost (both explicit and implicit) of migrating between cores. Explicit migration costs include the time required to transport the core's architecturally visible state, including the register file, program counter, and privilege bits. This state must be explicitly stored into memory, migrated to the new core and restored. However, there are also a number of implicit state migration costs for additional state that is not transferred but must be rebuilt on the new core. Several major implicit costs include the extra time required to warm up the L1 caches, branch prediction, and dependence predictor history on the new core.

However the present techniques propose a "Composite Core", an architecture that reduces the switching overheads by bringing the notion of heterogeneity within a single core. The proposed architecture pairs "big" (high performance) and "little" (energy efficient) compute μEngines that together can achieve high performance and energy efficiency. As only one μEngine is active at a time, execution switches dynamically between the μEngines to best match the current application's characteristics to the hardware resources. By sharing much of the architectural state between the μEngines, the switching overhead can be significantly reduced with respect to prior art systems, enabling much finer granularity (on the order of a thousand instructions) compared to past heterogeneous multicore proposals, allowing the application to spend more time on the energy efficient μEngine without sacrificing additional performance.

Figure 3:
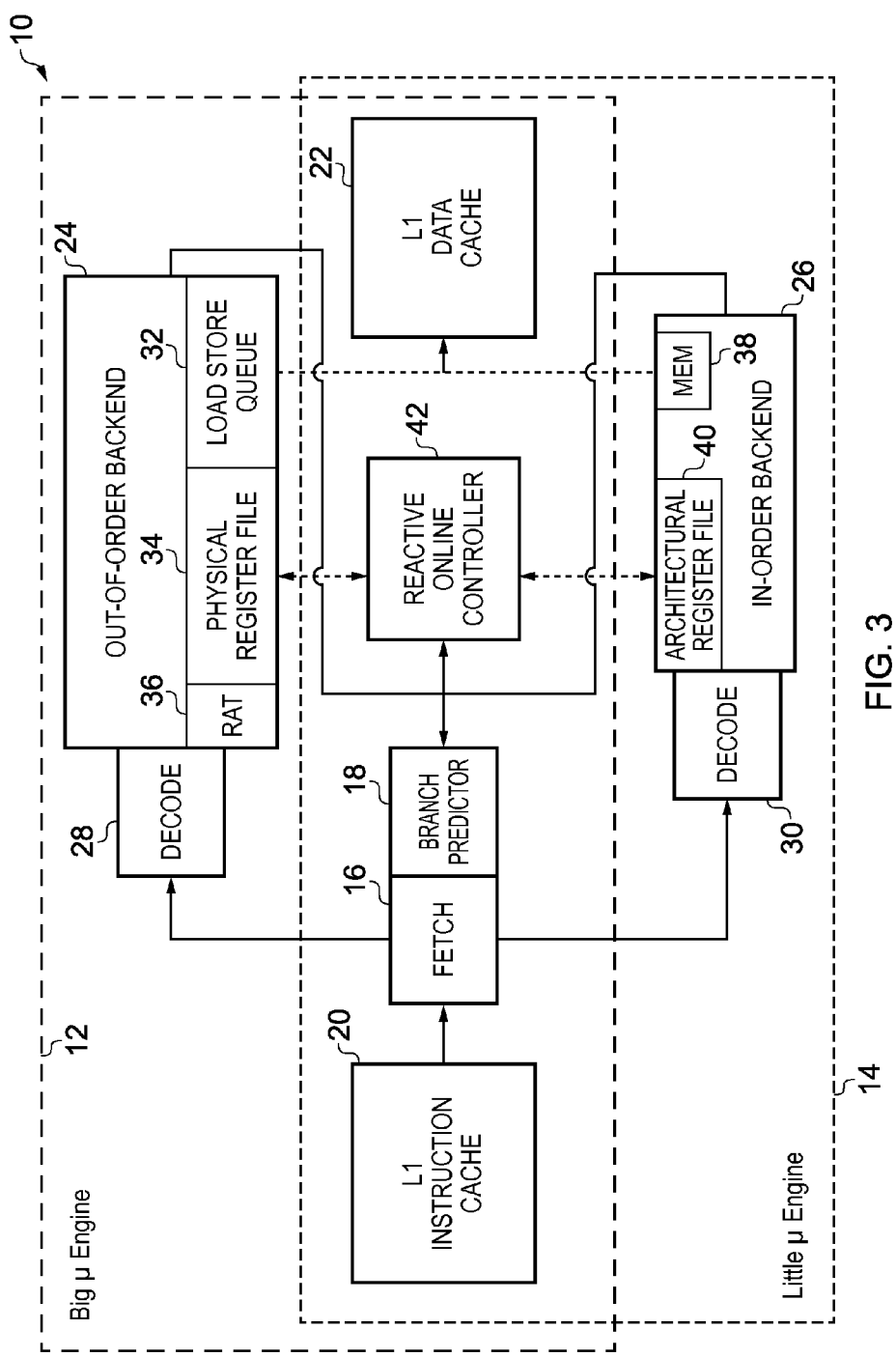
FIG. 3 schematically illustrates a processor core in one embodiment.

FIG. 3 schematically illustrates a "composite" processor core 10 in one embodiment. This composite core 10 consists of two tightly coupled compute μEngines, a first "big" μEngine 12 and a second "little" μEngine 14. Configured in this manner the processor core 10 can achieve high performance and energy efficiency by rapidly switching between the μEngines in response to changes in application performance. To reduce the overhead of switching, the μEngines share as much state as possible. As FIG. 3 illustrates, the μEngines share a front-end, consisting of a fetch engine 16 and a branch predictor 18, and multiplex access to the same L1 instruction and data caches 20 and 22 respectively. Conversely, each μEngine has its own back end 24 and 26 respectively, essentially consisting of an execution pipeline with its associated registers and memory access structures. The register files of the two μEngines are kept separate to minimize the little μEngine's register access energy. Further, as in this embodiment the two μEngines are configured sufficiently differently that the respective μEngines require different control signals from decode, each μEngine has its own decode stage 28, 30.

Each μEngine has a separate back-end implementation, the big μEngine back end 24 striving for high performance and the little μEngine back end 26 striving for increased energy efficiency. However, both μEngines multiplex access to a single L1 data cache 22, again to maximize shared state and further reduce switching overheads. The respective register file content is the only state that must be explicitly transferred to switch to the opposite μEngine. The big μEngine 12 is similar to a traditional high performance out-of-order backend. It is a superscalar highly pipelined design that includes complicated issue logic, a large reorder buffer, numerous functional units, a complex load/store queue (LSQ) 32, and register renaming with a large physical register file 34 and a Register Allocation Table (RAT) 36. The big μEngine 12 relies on these complex structures to support both reordering and speculation in an attempt to maximize performance at the cost of increased energy consumption. The little μEngine 14 is comparable to a more traditional in-order backend. It has a reduced issue width, simpler issue logic, reduced functional units, and lacks many of the associatively searched structures (such as the issue queue or LSQ). Only a simple memory access structure 38 is provided and by only maintaining an architectural register file 40, the little μEngine eliminates the need for renaming and improves the efficiency of register file accesses.

The processor core 10 also has a reactive online controller 42, which determines when the processor core operates in a first mode (when the big μEngine 12 is active) and when it operates in a second mode (when the little μEngine 14 is active). The reactive online controller 42 attempts to maximize energy savings subject to a configurable maximum performance degradation, or slowdown. To determine the appropriate μEngine to minimize performance loss, the controller estimates the dynamic performance loss, which is the difference between the observed performance of the composite core 10 and the performance if the application were to run entirely on the big μEngine 12, and makes switching decisions such that the estimated performance loss is within a parameterizable bound. These switching decisions are thus made to satisfy a predetermined metric which counterbalances the energy consumption and the cycles-per-instruction rate.

The controller 42 consists of three main components: a performance estimator, threshold controller, and switching controller which are describe in more detail below with reference to FIG. 5A. The performance estimator tracks the performance on the active μEngine and uses a model to provide an estimate for the performance of the inactive μEngine as well as provide a cumulative performance estimate. This data is then fed into the switching controller, which estimates the performance difference for the following quantum. The threshold controller uses the cumulative performance difference to estimate the allowed performance drop in the next quantum for which running on the little µEngine is profitable. The switching controller uses the output of the performance estimator and the threshold controller to determine which µEngine should be activated for the next quantum, i.e. whether processor core should operate in its first mode or its second mode.

Figure 4A:
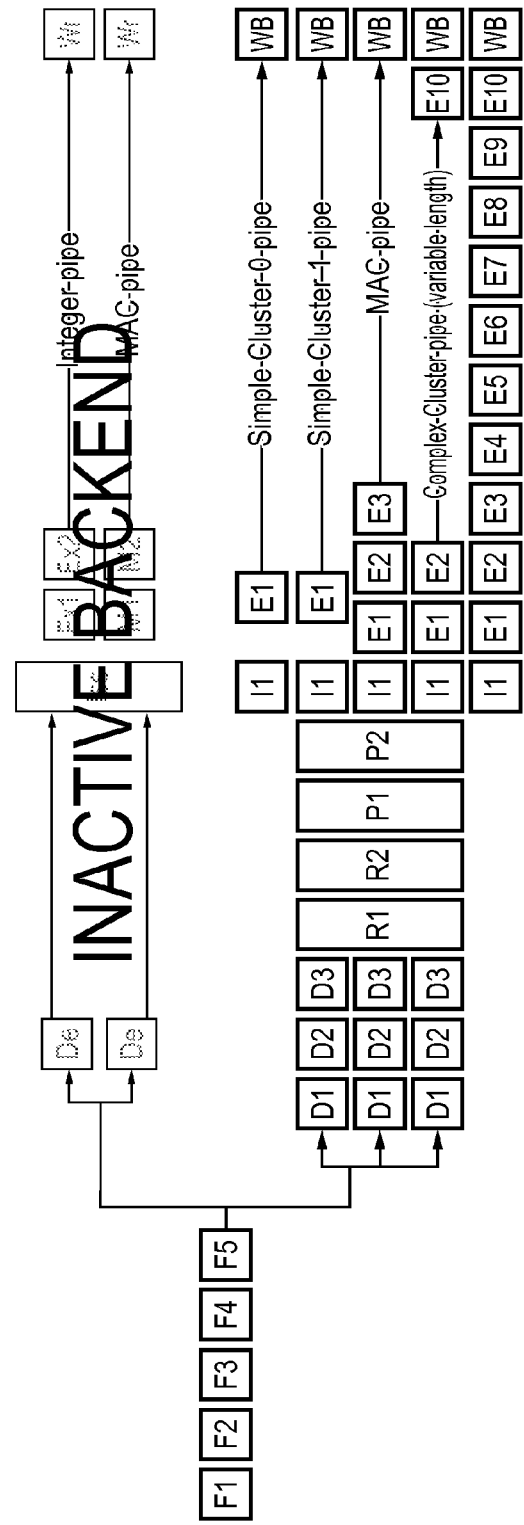
FIG. 4A schematically illustrates the pipeline stages of a processor core in one embodiment when operating in a first mode of operation.
Figure 4B:
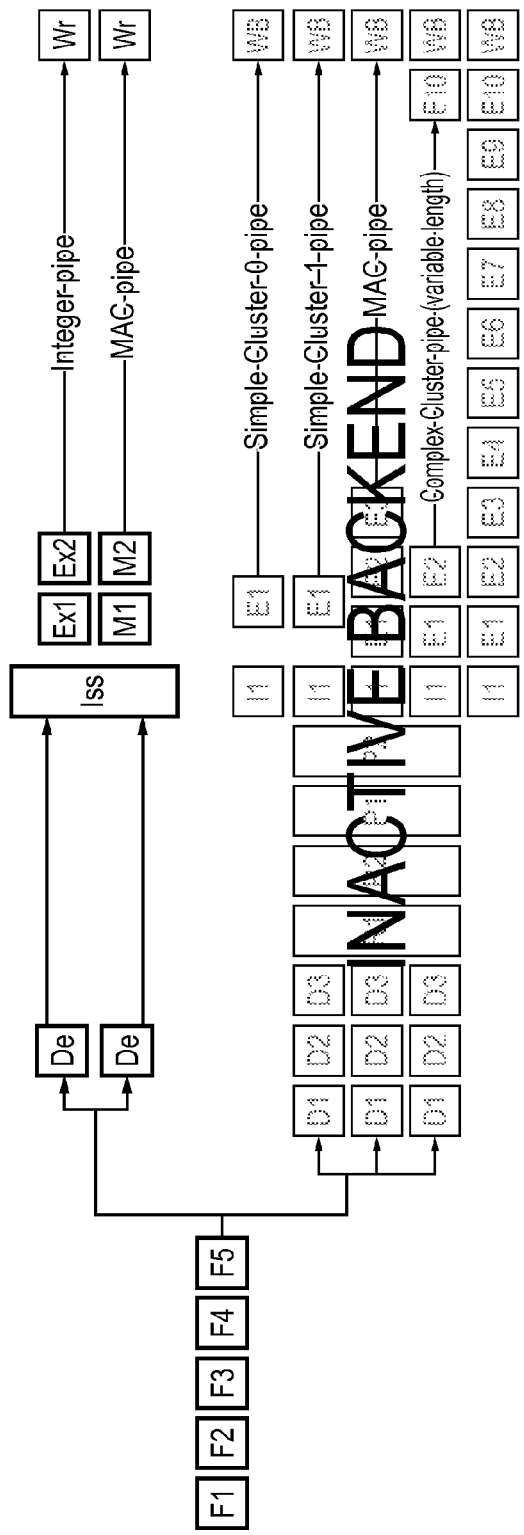
FIG. 4B schematically illustrates the pipeline stages of the processor core of FIG. 4A when operating in a second mode of operation.

FIG. 4A schematically illustrates the processor core 10 when operating in its first "big" mode, in particular showing the pipelined stages of the big µEngine 12 which are then active. The processor core 10 then appears very similar to a conventional high performance processor core (for example such as the Cortex A15 design provided by ARM Ltd, Cambridge, UK) with the exception that it now has an unused execution pipeline (labelled "INACTIVE BACKEND") that is currently clock-gated to minimize dynamic power consumption. When in this first mode, the processor core 10 is able to achieve high performance at the cost of higher power consumption. FIG. 4B schematically illustrates the processor core 10 when operating in its second "little" mode, in particular showing the pipelined stages of the little µEngine 14 which are then active. The same fetch stages are equally active in the first mode as in the second mode. However, referring to the pipelined stages of the little µEngine 14 which are now active, it can be seen that the processor core 10 now more closely resembles a conventional energy efficient processor core (for example such as the Cortex A7 design provided by ARM Ltd, Cambridge, UK). Additionally, the big µEngine's execution pipeline is now clock-gated to reduce dynamic energy (labelled "INACTIVE BACKEND"). When in this energy efficient second mode, the processor core 10 is able to execute instructions more efficiently due to the reduced number of active transistors. However, this mode functions at a reduced average performance level relative to the first, big mode. Therefore this mode is used when the application experiences periods of low performance, such as multiple Last Level Cache (LLC) load misses or multiple branch mispredictions. When used selectively in this way, it is able to achieve similar levels of performance as the big mode, but at reduced power levels.

Figures 5A, 5B, 5C:
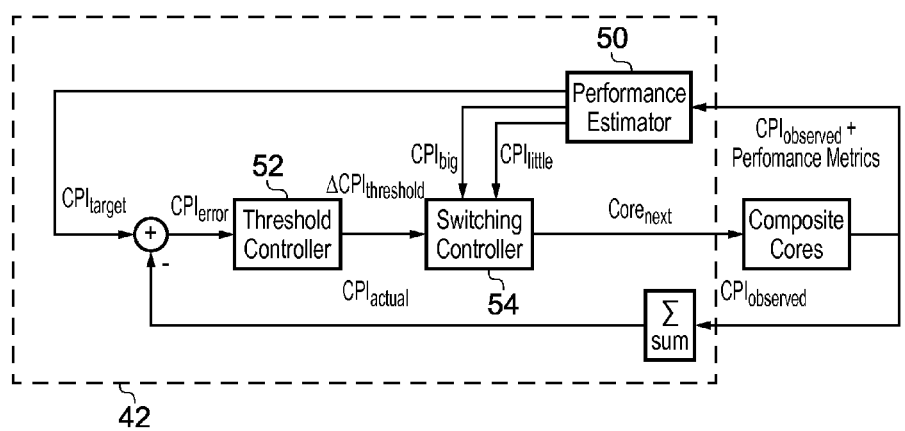
FIG. 5A schematically illustrates the control flow of the performance controller of a processor core in one embodiment.
FIG. 5B illustrates the calculation of an estimated cycles-per-instruction rate for an inactive back end by applying a mode-specific conversion coefficient to each of a number of performance metrics measured from an active back end in one embodiment.
FIG. 5C illustrates the calculation of a threshold value in dependence on a proportional-integral summation of a difference between a target cycles-per-instruction rate and an observed cycles-per-instruction rate for the processor core in one embodiment.

FIG. 5A schematically illustrates the configuration and control flow of the reactive online controller 42 of FIG. 3. The three main components of the controller 42 are a performance estimator 50, a threshold controller 52, and a switching controller 54. The controller 42 monitors the current performance of the processor core 10 and decides when to switch to the more energy efficient backend.

The performance estimator 50 is configured to provide an estimate of the performance of both µEngines in the previous quantum as well as track the overall performance for all past quanta. While the performance of the active µEngine can be trivially determined by counting the cycles required to complete the current quantum, the performance of the inactive µEngine is not known and must be estimated. This estimation is challenging as the micro-architectural differences in the two µEngines cause their behaviours to differ. The usual prior art approach to comparing the performance of two asymmetrically configured processor cores has been to sample execution on each for a short duration at the beginning of each quantum and base the decision for the remainder of the quantum on the sample measurements. However, this approach is not feasible for the fine-grained quanta of the present techniques for two reasons. Firstly, the additional switching necessary for sampling would require much longer quanta to amortize the overheads, forfeiting potential energy gains. Secondly, the stability and accuracy of fine-grained performance sampling drops rapidly, since performance variability grows as the measurement length shrinks. Simple rule based techniques, such as switching to the little µEngine on a cache miss, cannot provide an effective performance estimate needed to allow the user to configure the performance target. As this controller is run frequently, more complex approaches, such as non-linear or neural-network models, add too much energy overhead and hardware area to be practical. Therefore the present techniques instead propose monitoring a selected number of performance metrics on the active µEngine that capture fundamental characteristics of the application and uses a simple performance model to estimate the performance of the inactive µEngine. More detail of the performance metrics used is given below with reference to FIG. 6.

The performance model used by the performance estimator 50 provides an estimate for the inactive µEngine by substituting the observed metrics into a model for the inactive µEngine's performance. As this computation must be performed often, a simple linear model is chosen to reduce the computation overhead. The equation shown in FIG. 5B and below as Equation 1 defines the model, which consists of the sum of a constant coefficient ($a_0$) and several input performance metrics ($x_i$) scaled by a conversion coefficient ($a_i$). As the coefficients are specific to the active µEngine, two mode-specific sets of coefficients are required, one set is used to estimate performance of the big µEngine while the little µEngine is active, and vice versa.

$$CPI_{inactive} = a_0 + \Sigma a_i x_i \qquad (Eq. 1)$$

To determine the coefficients for the performance monitor, a number of benchmark applications are profiled on both the big µEngine 12 and the little µEngine 14 for 100 million instructions (after a 2 billion instruction fast-forward) using each benchmark's supplied training input set. A ridge regression analysis is used to determine the coefficients using the aggregated performance metrics from all benchmarks.

Figure 6:
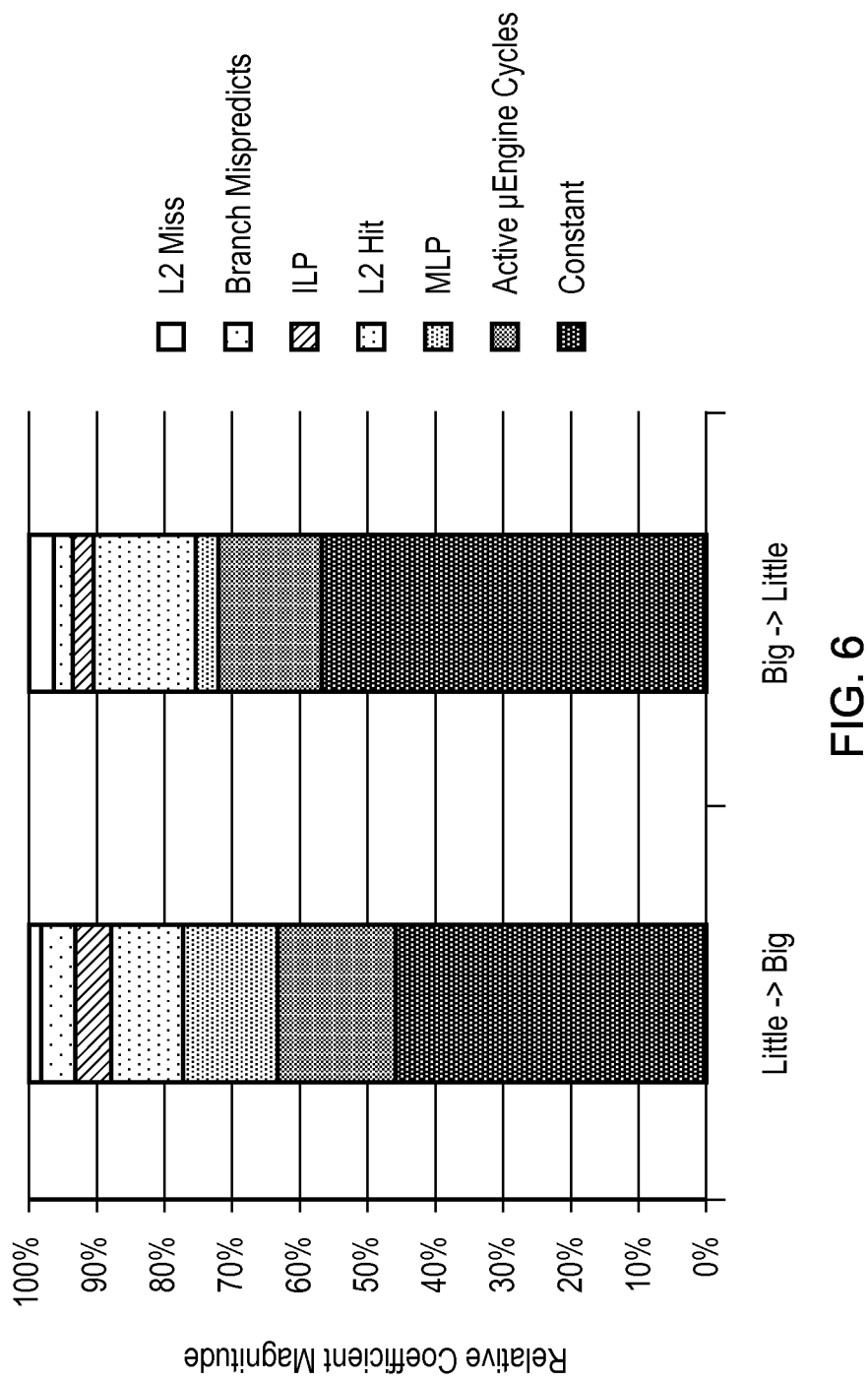
FIG. 6 illustrates the relative magnitude of the mode-specific conversion coefficients used to scale the performance metrics measured from an active back end into an estimate for the same performance metrics on an inactive back end and vice versa in one embodiment.

The magnitude of each normalized coefficient for both models is shown in FIG. 6, illustrating the relative importance of each metric to overall performance for each µEngine. The constant term reflects the baseline weight assigned to the average performance of the active µEngine without considering the metrics. The "Active µEngine Cycles" metric scales the model's estimate based on the CPI of the active µEngine. "MLP" attempts to measure the levels of memory parallelism and account for the µEngine's ability to overlap memory accesses. "L2 Hit" tracks the number of L2 cache hits and scales the estimate to match the µEngine's ability to tolerate medium latency misses. "ILP" attempts to scale the performance estimate based on the inactive µEngine's ability (or inability) to exploit independent instructions. "Branch Mispredicts" and "L2 Miss" scales the estimate based on the number of branch mispredictions and L2 cache misses respectively.

The model labelled "Little->Big" in FIG. 6 is used to estimate the performance of the big µEngine 12 while the little µEngine 14 is active. In general good performance on the little µEngine indicates good performance on the big µEngine. As the big µEngine is better able to exploit both MLP and ILP, its performance can improve substantially over the little µEngine for applications that exhibit these characteristics. However, the increased pipeline length of the big µEngine makes it slower at recovering from a branch mispredict than the little µEngine, decreasing the performance estimate. Finally, as L2 misses occur infrequently and the big µEngine is designed to partially tolerate memory latency, the L2 Miss coefficient in this model has minimal impact on the overall estimate.

Conversely the model labelled "Big->Little" in FIG. 6 is used to estimate the performance of the little µEngine while the big µEngine 12 is active. The little µEngine has a higher constant due to its narrower issue width causing less performance variance. As the little µEngine cannot exploit application characteristics like ILP and MLP as well as the big µEngine, the big µEngine's performance has slightly less impact than in the Little->Big model. L2 Hits are now more important as, unlike the big µEngine, the little µEngine is not designed to hide any of the latency. The inability of the little µEngine to utilize the available ILP and MLP in the application causes these metrics to have almost no impact on the overall performance estimate. Additionally, as the little µEngine can recover from branch mispredicts much faster, the mispredicts have very little impact. Finally even though L2 misses occur infrequently, the little µEngine suffers more performance loss than the big µEngine again due to the inability to partially hide the latency.

While the above coefficients give a good approximation for the performance of the inactive µEngine, some applications will warrant a more exact model. For example, in the case of memory bound applications, the large number of L2 misses and their impact on performance necessitates a heavier weight for the L2 Miss metric in the overall model. Therefore the architecture supports the use of per-application coefficients for both the Big->Little and Little->Big models, allowing programmers to use offline profiling to custom tailor the model to the exact needs of their application if necessary.

Returning to FIG. 5A, the second task of the performance estimator 50 is to track the actual performance of the composite core as well as provide an estimate of the target performance for the entire application. The actual performance is computed by summing the observed performance for all quanta (see Equation 2 below). The target performance is computed by summing all the observed and estimated performances of the big µEngine and scaling it by an allowed performance slowdown (see Equation 3 below). As the number of instructions is always fixed, rather than compute CPI the performance estimator hardware only sums the number of cycles accumulated, and scales the target cycles to compare against the observed cycles.

$$CPI_{actual} = \Sigma CPI_{observed} \quad \text{(Eq. 2)}$$

$$CPI_{target} = \Sigma CPI_{Big} \times (1 - Slowdown_{allowed}) \quad \text{(Eq. 3)}$$

The difference ($CPI_{error}$) between the target performance ($CPI_{target}$) and the observed performance ($CPI_{actual}$) is then used by the threshold controller 52, a proportional-integral (PI) controller with coefficients tuned for the processor core 10, to generate an estimate of the maximum performance difference between the big and little µEngines where running on the little µEngine is still preferable ($\Delta CPI_{threshold}$). This threshold is designed to provide an average per-quantum performance loss where using the little µEngine is profitable given the performance target. As some applications experience frequent periods of similar performance between the two µEngines, the controller scales the threshold low to ensure the little µEngine is only used when it is of maximum benefit. However for applications that experience almost no low performance periods, the controller scales the threshold higher allowing the little µEngine to run with a larger performance difference but less frequently. The threshold is determined as shown in Equation 5 below and in FIG. 5C. The P (Proportional) term attempts to scale the threshold based on the current observed error, or difference from the expected performance (see Equation 4). The I (Integral) term scales the threshold based on the sum of all past errors. A Derivative term could be added to minimize overshoot.

$$CPI_{error} = CPI_{target} - CPI_{actual} \quad \text{(Eq. 4)}$$

$$\Delta CPI_{threshold} = K_P \cdot CPI_{error} + K_I \cdot \Sigma CPI_{error} \quad \text{(Eq. 5)}$$

The constant $K_P$ and $K_I$ terms are determined experimentally. The $K_P$ term is large, reflecting the fact that a large error needs to be corrected immediately. However, this term suffers from systematically underestimating the overall performance target. Therefore the second term, $K_I$ is introduced to correct for small but systematic under-performance. This term is about three orders of magnitude smaller than $K_P$, so that it only factors into the threshold when a long-term pattern is detected.

The threshold value $\Delta CPI_{threshold}$ is then compared against the most recent performances for the two modes ($CPI_{big}$ and $CPI_{little}$), which are generated by the performance estimator 50 either using the observed performance (if the pipeline was active) or the estimated performance (if the pipeline was inactive). The switching controller 54 then determines if the performance difference between the two cores is less/greater than the threshold determined by the threshold controller. If the difference is less (or equal), the little µEngine is activated ($Core_{next}$=little), if it is greater the big µEngine is activated ($Core_{next}$=big). The decision is then enforced within the processor core for the following quantum (1000 instructions).

Figure 7:
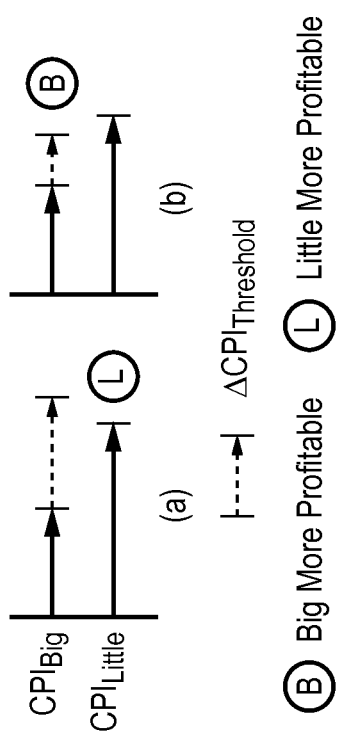
FIG. 7 schematically illustrates the behaviour of the switching controller in the performance controller of one embodiment with regard to whether to cause the processor core to switch to the first mode and the second mode.

In essence, the switching controller 54 attempts to determine which µEngine is most profitable for the next quantum. To estimate the next quantum's performance, the controller assumes the next quantum will have the same performance as the previous quantum. As shown in FIG. 7, the controller determines profitability by computing $\Delta CPI_{net}$ as set out below in Equation 6. If $\Delta CPI_{net}$ is positive, the little µEngine is currently more profitable, and execution is mapped to the little µEngine for the next quantum. However, if $\Delta CPI_{net}$ is negative, the performance difference between big and little is too large, making the little µEngine less profitable. Therefore the execution is mapped to the big µEngine for the next quantum.

$$\Delta CPI_{net} = (CPI_{Big} + \Delta CPI_{threshold}) - CPI_{little} \quad \text{(Eq. 6)}$$

Figure 8:
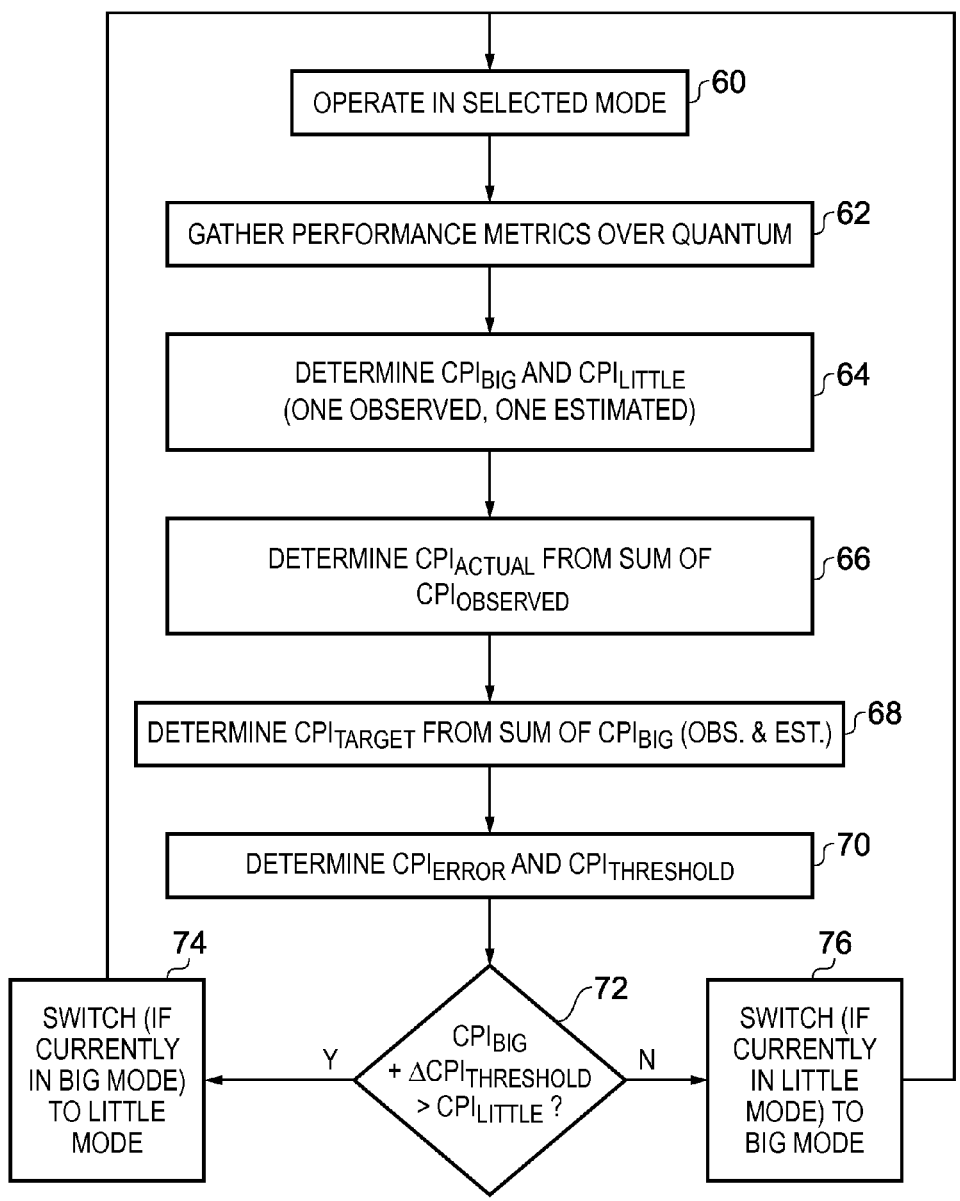
FIG. 8 schematically illustrates a sequence of steps which are taken by the processor core in one embodiment.

FIG. 8 schematically illustrates a sequence of steps which may be taken by the method of one embodiment when operating the processor core 10. The flow of steps can be considered to begin at step 60 where the processor core 10 is configured to operate for the next quantum in a selected one of the "big" or "little" modes of operation. Then at step 62 the performance metrics are gathered over the course of the next quantum. At step 64 the performance estimator 50 determines $CPI_{big}$ and $CPI_{little}$ (one observed, one estimated). Then at step 66 $CPI_{actual}$ is determined from the sum of $CPI_{observed}$ (see Equation 2 above) and at step 68 the performance estimator determines $CPI_{target}$ from the sum of $CPI_{big}$ (observed and estimated) (see Equation 3 above). Finally, at step 70, the difference ($CPI_{error}$) between the target performance ($CPI_{target}$) and the observed performance ($CPI_{actual}$) is determined and this is then used by the threshold controller 52 to generate $\Delta CPI_{threshold}$ (see Equation 5 above). Then the decision as to which mode to run in for the next quantum is taken by the switching controller 54 on the basis of the quantity $\Delta CPI_{net}$ as shown in Equation 6. If $\Delta CPI_{net}$ is positive, the flow proceeds to step 74 where the processor core is switched (if not already there) to little mode. Conversely, if $\Delta CPI_{net}$ is negative, the flow proceeds to step 76 where the processor core is switched (if not already there) to big mode. Whichever path was taken from step 72, the flow then returns to step 60 for the processor core 10 to operate for the next quantum in the selected mode.

Several performance counters are used to generate the detailed metrics required by the performance estimator 50. Most of these performance counters are already included in many contemporary systems, including counters for branch mispredicts, L2 cache hits and L2 cache misses. Some additional performance counters are needed in the big μEngine 12 as discussed below. Due to the micro-architectural simplicity of the little μEngine 14, tracking these additional metrics is more complicated, also discussed below.

The performance models rely heavily on measurements of both ILP and MLP, which are not trivially measurable in most modern systems. As the big μEngine 12 is already equipped with structures that exploit both ILP and MLP, a few low overhead counters are simply added to track these metrics. For ILP, a performance counter keeps a running sum of the number of instructions in the issue stage that are waiting on values from in-flight instructions. This captures the number of instructions stalled due to serialization as an inverse measure of ILP. To measure MLP, an additional performance counter keeps a running sum of the number of MSHR entries that are in use at each cache miss. While not perfect measurements, these simple performance counters give a good approximation of the amount of ILP and MLP per quantum.

Measuring ILP and MLP on the little μEngine 14 is challenging as it lacks the micro-architectural ability to exploit these characteristics and therefore has no way of measuring them directly. To address this the little μEngine 14 is provided with a simple table that dynamically tracks data dependence chains of instructions to measure these metrics. The design is from L. Chen, S. Dropsho, and D. Albonesi, "Dynamic data dependence tracking and its application to branch prediction," in Proc. of the 9th International Symposium on High-Performance Computer Architecture, 2003, pp. 65-. This table is a bit matrix of registers and instructions, allowing the little μEngine 14 to simply look up the data dependence information for an instruction. A performance counter keeps a running sum per quantum to estimate the overall level of instruction dependencies as a measure of the ILP. To track MLP, the dependence table is extended to track register dependencies between cache misses over the same quantum. Together these metrics allow the processor core 10 to estimate the levels of ILP and MLP available to the big μEngine 12.

Figure 9:
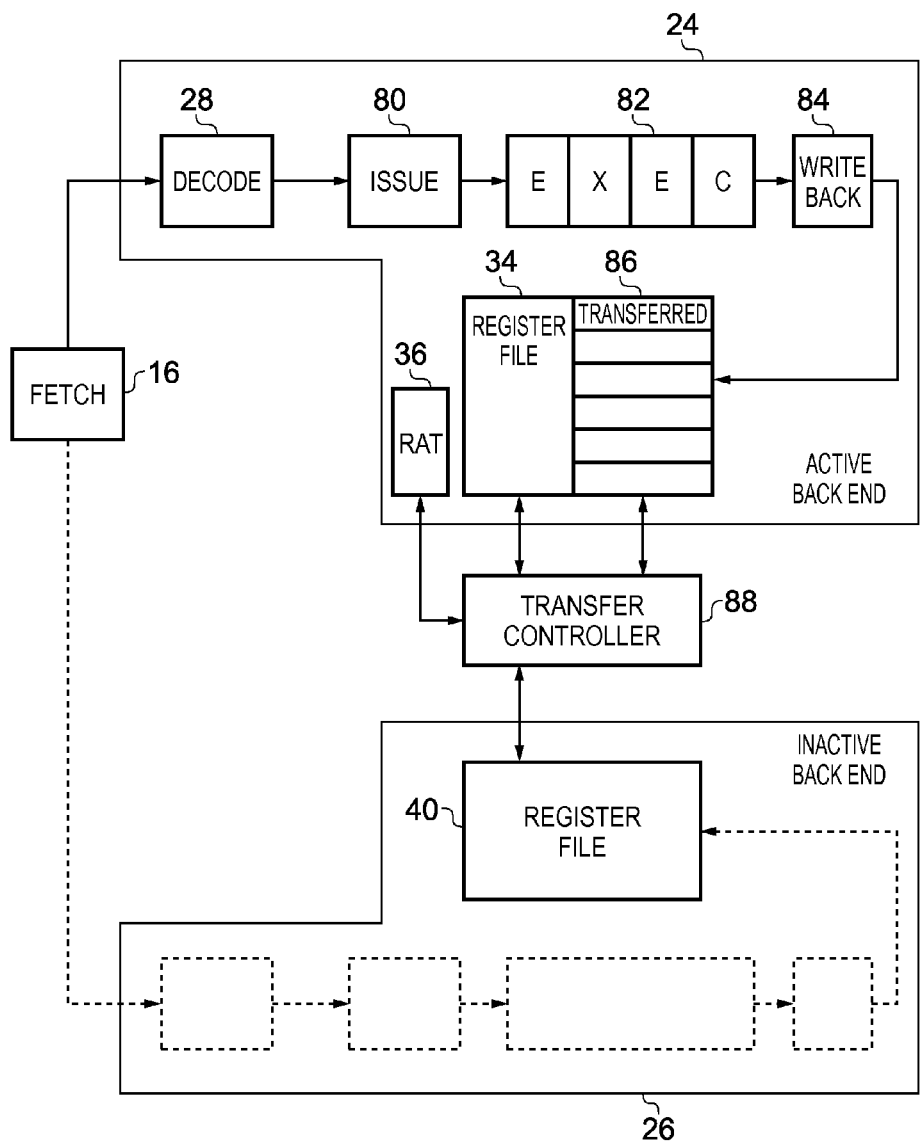
FIG. 9 schematically illustrates the components of the first and second back ends and a shared transfer controller which are involved in the transfer of architectural state from one back end to the other in one embodiment.

FIG. 9 schematically illustrates some components of the processor core 10, focussing on those that are of relevance to the process of switching the processor core from one operating mode to the other. In the particular moment represented in FIG. 9, the processor core is operating in its "big" mode and accordingly the "big" (out-of-order) back end 24 is currently active, whilst the "little" (in-order) back end 26 is inactive (clock-gated). Note that only a very high-level view of the active pipeline stages is shown, merely showing stages labelled decode 28, issue 80, execute 82 and write back 84, which intentionally ignores the complexity of the big back end (cf. FIG. 4A) purely for clarity of illustration. The processor core 10 comprises a transfer controller 88, which forms part of the reactive online controller 42, which is configured to transfer register content from the active back end to the inactive back end (in preparation for the currently inactive back end taking over the processing). In addition it can be seen in FIG. 9 that the register file 34 of the active back end is augmented by a "transferred state" marker, enabling each register entry to be marked as "transferred" or "untransferred". The function of this marking is described in more detail below.

Figure 10:
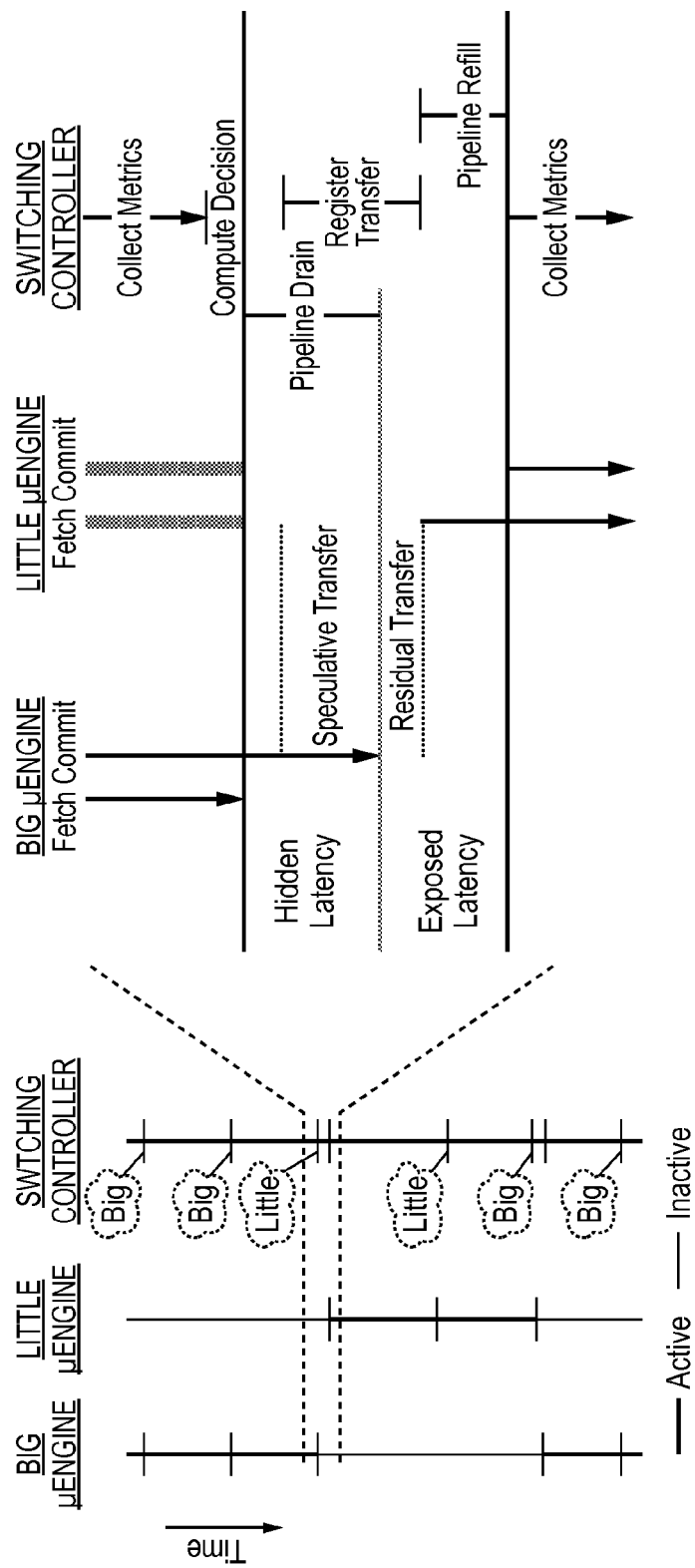
FIG. 10 schematically illustrates the relative timing of events when the processor core switches between its first and second modes of operation in one embodiment.

FIG. 10 illustrates the sequence of events when the switching controller 54 decides to switch μEngines (i.e. modes). As both μEngines have different backend implementations, they have incompatible micro-architectural state. Therefore, when the processor core 10 decides to switch, the current active μEngine must first be brought to an architecturally precise point before control can be transferred. If the big μEngine 12 is active, it has potentially completed a large amount of work speculatively, making a pipeline flush potentially wasteful. Therefore, the fetch engine 16 simply stops fetching instructions to the active μEngine, and allows the pipeline to drain before switching. As all other stateful structures have either been drained (e.g., pipeline stages) or are shared (e.g., branch predictor), the only state that must be explicitly transferred is the register file. While the active μEngine is draining, the processor core attempts to speculatively transfer as much of the register state as possible to hide switching latency. Once the active μEngine has completely drained, the remaining registers are transferred during the residual transfer. More details of the register transfer process are given below. Once the register transfer has been completed, fetch resumes with the instructions now redirected to the opposite μEngine. The new μEngine will incur an additional delay while its pipeline stages are refilled. Therefore the total switch latency is the sum of the pipeline drain, register transfer, and the pipeline refill delay. As the pipeline drain is totally hidden and a majority of the register file values can be speculatively transferred, the only exposed latency is the residual register transfer and the pipeline refill latency of the new μEngine. As this latency is similar to that of a branch mispredict, the switching overheads behave very similarly to that of a branch misprediction recovery.

As the register file is the only architecturally visible stateful component that is not shared, its contents must be explicitly transferred during a μEngine switch. This transfer is complicated by the fact that the little μEngine 14 only contains architectural registers 40 with a small number of read and write ports while the big μEngine 12 uses register renaming and a larger multi-ported physical register file 34. To copy a register from the big μEngine 12 to the little μEngine 14, the architectural-to-physical register mapping must first be determined using the Register Allocation Table (RAT) 36 before the value can be read from the physical register file. Typically this is a two cycle process. When the reactive online controller 42 initiates a switch, the registers in the active μEngine are marked as untransferred. The controller then utilizes a pipelined state machine (transfer controller 88) to transfer the registers. The first stage determines the next untransferred register, marks it as transferred, and uses the RAT 36 to lookup the physical register file index corresponding to the architectural register. Recall that while the big μEngine 12 is draining, its RAT read ports are not needed by the pipeline (no new instructions are dispatched). The second stage reads the register's value from the physical register file. The final stage transfers the register to the inactive μEngine. To hide the latency of the register transfer, the processor core begins speculatively transferring registers before the active μEngine is fully drained. Therefore, when a register value is overwritten by the draining pipeline it is again marked as untransferred. The transfer controller 88 will then transfer the updated value during the residual transfer of FIG. 10. The transfer controller 88 will continue to run until the pipeline is fully drained and all architectural registers have been transferred. Once all registers have been transferred, the opposite μEngine can begin execution. The process of transferring registers from the little μEngine 14 to the big μEngine 12 is similar, except there is now a single cycle register read on the little μEngine and a two cycle register write on the big μEngine.

Figure 11:
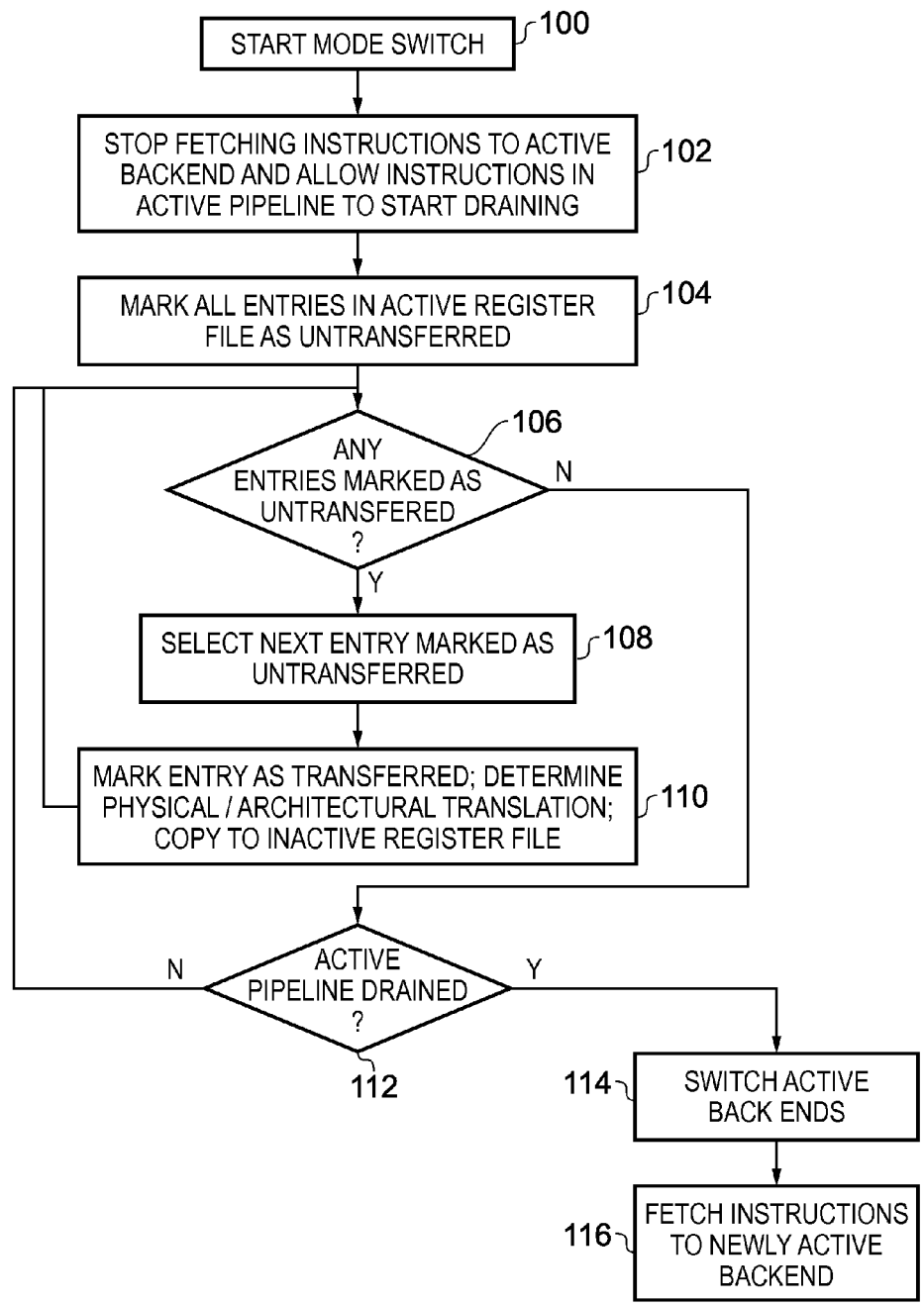
FIG. 11 schematically illustrates a sequence of steps which are taken by the processor core when mode switching in one embodiment.

FIG. 11 schematically illustrates a sequence of steps which may be taken by the method of one embodiment when switching the processor core 10 between its operating modes. The mode switch begins at step 100, when the corresponding signal is received from the switching controller 54. On receipt of this signal, at step 102, the fetch engine 16 stops fetching instructions to the active backend and instructions are allowed to start draining from the active pipeline (i.e. without seeking to replace them). At step 104 all entries in the active register file are marked as untransferred. A looping subset of steps to carry out the register content transfer then begins at step 106, where it is determined if any register entries are marked as untransferred. Clearly at the first iteration of this looping subset of steps following step 104 this will be true and the flow proceeds to step 108 where a next entry marked as untransferred in the active register file is selected. Then at step 110 the selected entry is marked as transferred, the physical/architectural register translation is determined as appropriate to the transfer direction, and the register entry is copied to the inactive register file. The flow then loops back to step 106 to determine if any further register entries are marked as untransferred. Whilst this is the case the loop of steps 106, 108 and 110 continue to be taken. Once it is determined at step 106 that no further entries in the active register file are marked as untransferred, then the flow proceeds to step 112, where it is determined if all instructions have now drained from the active pipeline. If any instructions remain in the active pipeline then the flow returns to step 106 to ensure that any register entries amended by these final instructions leaving the active pipeline are copied again. Once the active pipeline has drained and all entries are marked as transferred then the flow proceeds to step 114, where the reactive online controller 42 causes the active back end to be clock-gated (and thus become the new inactive back end) and terminates the clock-gating of the inactive back and (which thus becomes the new active backend). The reactive online controller 42 then, at step 116, causes the fetch engine 16 to begin fetching instructions to the newly active backend.

Figure 12:
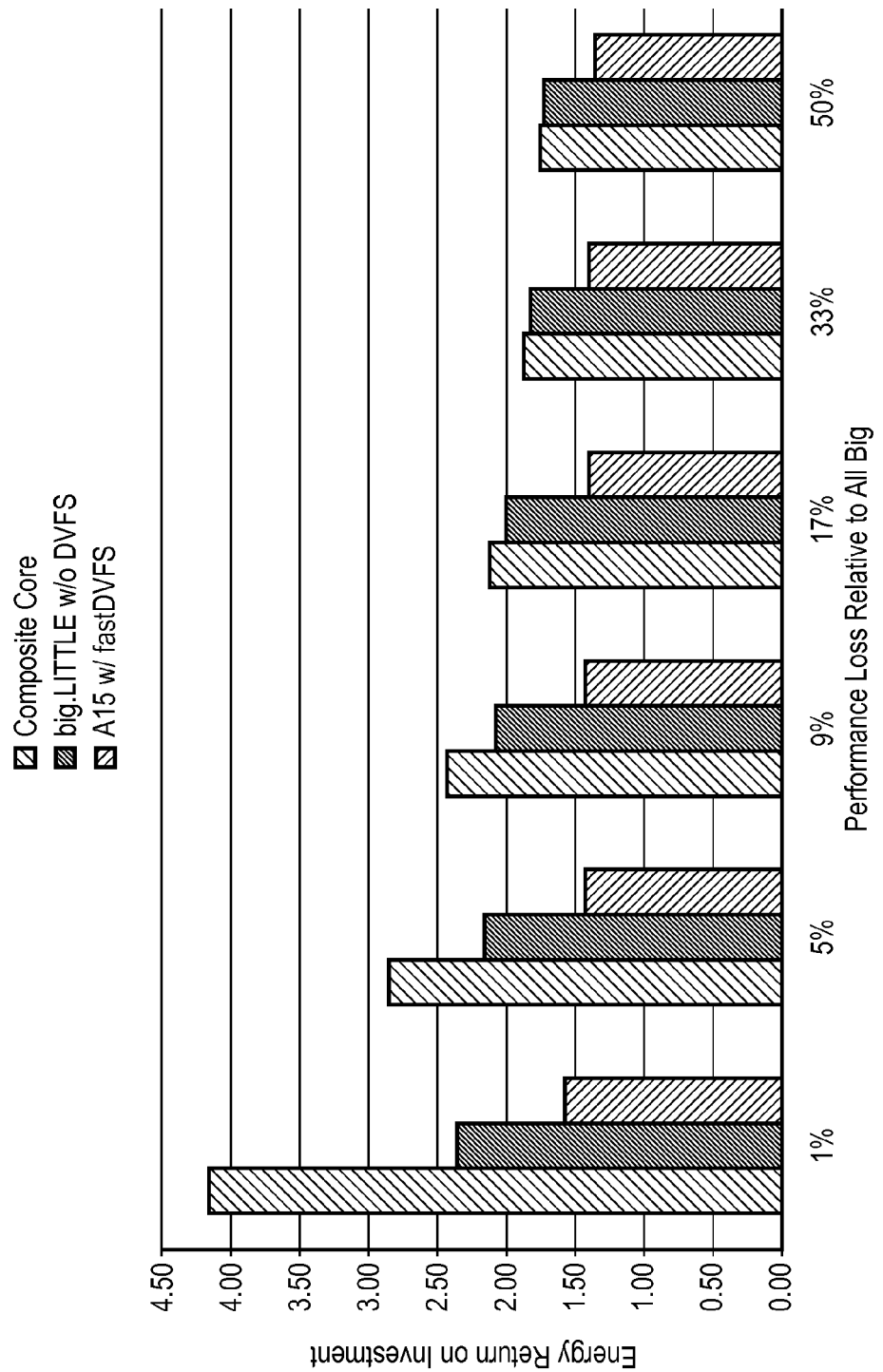
FIG. 12 shows the energy savings return on investment, or the ratio of energy savings over performance loss, for a processor core in one embodiment compared to two alternative system configurations.

A comparative study has been performed of how the "Composite Core" architecture presented here compares to both an existing heterogeneous architecture (ARM's big.LITTLE technology mentioned above) as well as a future design of low-latency Dynamic Voltage and Frequency Scaling (DVFS) with an existing ARM Cortex A15 core. This study was performed by constructing performance models for these designs in the Gem5 simulator and using an oracle to determine the optimum core. Various SPEC06 benchmarks were then simulated and averaged together to determine the average benefit of each technique. Power models using McPAT were constructed to determine the average energy consumption for each technique. The results of the study are shown in FIG. 12. It is observed that at small levels of performance loss, the Composite Core is able to achieve a significantly higher energy savings return for the performance loss relative to both big.LITTLE w/o DVFS and A15 w/fast DVFS. Yet at higher levels of performance losses, the big.LITTLE system is able to match the returns of the Composite Core. This demonstrates that a Composite Core is more able to achieve energy reductions while nearly maintaining performance, but that big.LITTLE must suffer significant performance loss in order to be competitive with a Composite Core. Finally, A15 w/fast DVFS illustrates that even a future implementation of DVFS will not be able to match the energy savings returns possible with a Composite Core.

Although particular embodiments of the invention have been described herein, it will be apparent that the invention is not limited thereto, and that many modifications and additions may be made within the scope of the invention. For example, various combinations of the features of the following dependent claims could be made with the features of the independent claims without departing from the scope of the present invention.

We claim:

1. A processor core configured to carry out data processing operations in dependence on a sequence of data processing instructions, the processor core comprising:
   a front end, a first back end and a second back end, the front end comprising a fetch engine configured to retrieve the sequence of data processing instructions for both the first back end and the second back end from a memory, and the first and second back ends each configured to execute the sequence of program instructions,
   wherein the processor core is configured to operate in a first mode in which the first back end is active and receives the sequence of data processing instructions from the fetch engine and the second back end is inactive, and the processor core is configured to operate in a second mode in which the first back end is inactive and the second back end is active and receives the sequence of data processing instructions from the fetch engine, wherein an average cycles-per-instruction rate is lower and an energy consumption is higher for the first mode than the second mode,
   and the processor core further comprises a performance controller configured to control whether the processor core operates in the first mode or the second mode to thereby satisfy a predetermined metric which counterbalances the energy consumption and the cycles-per-instruction rate, wherein
   the performance controller comprises a performance estimator configured, when the processor core is in the first mode, to generate an estimated cycles-per-instruction rate of the processor core over a predetermined interval if the processor had been in the second mode, and configured, when the processor core is in the second mode, to generate the estimated cycles-per-instruction rate of the processor core over the predetermined interval if the processor had been in the first mode.

2. The processor core as claimed in claim 1, wherein the performance estimator is configured to receive a plurality of performance metrics indicative of a current performance of the processor core and to generate the estimated cycles-per-instruction rate in dependence on the plurality of performance metrics, wherein a mode-specific conversion coefficient is applied to each performance metric.

3. The processor core as claimed in claim 2, wherein the performance estimator is configured to generate the estimated cycles-per-instruction rate using a linear sum of the plurality of performance metrics each scaled by its respective mode-specific conversion coefficient.

4. The processor core as claimed in claim 2, wherein the performance estimator is configured to vary the mode-specific conversion coefficient applied to each performance metric in dependence on a data processing operations carried out by the processor core.

5. The processor core as claimed in claim 1, wherein the performance controller comprises a switching controller configured to cause the processor core to switch to the second mode if the estimated cycles-per-instruction rate is less than a measured first mode cycles-per-instruction rate of the processor core over the predetermined interval plus a threshold value, and
  configured to cause the processor core to switch to the first mode if the estimated cycles-per-instruction rate plus the threshold value is less than a measured second mode cycles-per-instruction rate of the processor core over the predetermined interval.

6. The processor core as claimed in claim 5, wherein the performance controller comprises a threshold controller configured to set the threshold value in dependence on a difference between a target cycles-per-instruction rate and an observed cycles-per-instruction rate for the processor core.

7. The processor core as claimed in claim 6, wherein the threshold controller is configured to set the threshold value in dependence on a proportional-integral summation of the difference.

8. The processor core as claimed in claim 7, wherein a proportional coefficient is at least 100 times larger than an integral coefficient in the proportional-integral summation.

9. The processor core as claimed in claim 6, wherein the performance estimator is configured to set the target cycles-per-instruction rate using a sum of previously measured first mode cycles-per-instruction rates and previously estimated first mode cycles-per-instruction rates, scaled by a predetermined allowed slowdown factor.

10. The processor core as claimed in claim 1, wherein the processor core is configured to perform a mode switch in response to a mode switch signal from the performance controller which indicates that the processor core should switch from a current mode of the first mode and the second mode to a target mode of the first mode and the second mode,
  wherein the mode switch comprises the fetch engine stopping providing the sequence of data processing instructions to an active back end of the first back end and second back end which has been active in the current mode,
  the processor core switches to the target mode after all pending data processing instructions have completed in the active back end,
  and thereafter the fetch engine begins providing the sequence of instructions to a target back end of the first back end and the second back end which is active in the target mode.

11. The processor core as claimed in claim 10, wherein the first back end comprises a first register file and the second back end comprises a second register file, wherein the mode switch comprises the processor core initiating transfer of content from an active register file of the first register file and the second register file to a target register file of the first register file and the second register file in response to the mode switch signal and before all pending data processing instructions have completed in the active back end, and the processor core switches to the target mode after completion of the transfer of content from the active register file to the target register file.

12. The processor core as claimed in claim 11, wherein in response to the mode switch signal and before the transfer of content from the active register file to the target register file begins, register values stored in the active register file are marked as untransferred,
  and when a selected register value is transferred from the active register file to the target register file the selected register value is marked as transferred,
  and if a pending data processing instruction draining from the active back end amends the selected register value it is remarked as untransferred,
  and the transfer of content continues until all pending data processing instructions have completed in the active back end and all register values stored in the active register file are marked as transferred.

13. The processor core as claimed in claim 1, wherein the predetermined metric is configured to minimise the energy consumption subject to a maximum cycles-per-instruction rate.

14. The processor core as claimed in claim 1, wherein the predetermined metric is configured to minimise the cycles-per-instruction rate subject to a maximum energy consumption.

15. The processor core as claimed in claim 1, wherein the first back end comprises an out-of-order execution pipeline and the second back end comprises an in-order execution pipeline.

16. The processor core as claimed in claim 1, wherein the second back end is clock gated in the first mode and wherein the first back end is clock gated in the second mode.

17. The processor core as claimed in claim 1, wherein the front end comprises a shared instruction cache associated with the fetch engine.

18. The processor core as claimed in claim 1, wherein the front end comprises a shared branch prediction unit associated with the fetch engine.

19. The processor core as claimed in claim 1, wherein the first back end and the second back end are each configured to access the memory via a shared first level data cache.

20. The processor core as claimed in claim 1, wherein the first back end comprises a first decode stage configured to decode the sequence of program instructions for the first back end, and wherein the second back end comprises a second decode stage configured to decode the sequence of program instructions for the second back end.

21. The processor core as claimed in claim 1, wherein the performance controller is configured to regularly determine at a predetermined interval if the processor core should switch between the first mode and the second mode, wherein the predetermined interval is less than one hundred thousand instructions.

22. The processor core as claimed in claim 1, wherein the predetermined interval is less than ten thousand instructions.

23. A method of operating a processor core configured to carry out data processing operations in dependence on a sequence of data processing instructions, wherein the processor core comprises a front end, a first back end and a second back end, the front end comprises a fetch engine configured to retrieve the sequence of data processing instructions for both the first back end and the second back end from a memory, and the first and second back ends are each configured to execute the sequence of program instructions, the method comprising the steps of:
  operating in a first mode in which the first back end is active and receives the sequence of data processing instructions and the second back end is inactive;
  operating in a second mode in which the first back end is inactive and the second back end is active and receives the sequence of data processing instructions, wherein an average cycles-per-instruction rate is lower and an energy consumption is higher for the first mode than the second mode; and controlling whether the processor core operates in the first mode or the second mode to thereby satisfy a predetermined metric which counterbalances the energy consumption and the cycles-per-instruction rate, wherein when the processor core is in the first mode, generating an estimated cycles-per-instruction rate of the processor core over a predetermined interval corresponding to the processor being in the second mode; and when the processor core is in the second mode, to generate the estimated cycles-per-instruction rate of the processor core over the predetermined interval corresponding to the processor being in the first mode.

24. A processor core configured to carry out data processing operations in dependence on a sequence of data processing instructions, the processor core comprising:

a front end, a first back end and a second back end, the front end comprising means for retrieving the sequence of data processing instructions for both the first back end and the second back end from a memory, and the first and second back ends each comprising means for executing the sequence of program instructions, wherein the processor core is configured to operate in a first mode in which the first back end is active and receives the sequence of data processing instructions from the means for retrieving and the second back end is inactive, and the processor core is configured to operate in a second mode in which the first back end is inactive and the second back end is active and receives the sequence of data processing instructions from the means for retrieving, wherein an average cycles-per-instruction rate is lower and an energy consumption is higher for the first mode than the second mode, the processor core further comprises means for controlling whether the processor core operates in the first mode or the second mode to thereby satisfy a predetermined metric which counterbalances the energy consumption and the cycles-per-instruction rate, and the means for controlling whether the processor core operates in the first mode or the second mode comprises means for estimating performance when the processor core is in the first mode by generating an estimated cycles-per-instruction rate of the processor core over a predetermined interval corresponding to the processor being in the second mode and for estimating performance when the processor is in the second mode by generating the estimated cycles-per-instruction rate of the processor core over the predetermined interval corresponding to the processor being in the first mode.

* * * * *